(12) United States Patent
Tallam et al.

(10) Patent No.: US 8,488,345 B2
(45) Date of Patent: Jul. 16, 2013

(54) PULSE WIDTH MODULATION CONTROL METHOD AND SYSTEM FOR MITIGATING REFLECTED WAVE EFFECTS IN OVER-MODULATION REGION

(75) Inventors: Rangarajan M. Tallam, Germantown, WI (US); David Leggate, New Berlin, WI (US)

(73) Assignee: Rockwell Automation Technologies, Inc., Mayfield, OH (US)

( * ) Notice: Subject to any disclaimer, the term of this patent is extended or adjusted under 35 U.S.C. 154(b) by 155 days.

(21) Appl. No.: 12/957,672

(22) Filed: Dec. 1, 2010

(65) Prior Publication Data
US 2012/0140532 A1 Jun. 7, 2012

(51) Int. Cl.
*H02M 5/45* (2006.01)

(52) U.S. Cl.
USPC ............................. 363/37; 363/98; 363/132

(58) Field of Classification Search
USPC .................................. 363/37, 97, 98, 131, 132
See application file for complete search history.

(56) References Cited

U.S. PATENT DOCUMENTS

| | | | |
|---|---|---|---|
| 4,516,065 A | 5/1985 | Ninomiya et al. | |
| 4,904,919 A | 2/1990 | McNaughton | |
| 4,978,894 A * | 12/1990 | Takahara | 318/768 |
| 5,361,196 A * | 11/1994 | Tanamachi et al. | 363/41 |
| 5,610,806 A | 3/1997 | Blasko et al. | |
| 5,625,550 A | 4/1997 | Leggate et al. | |
| 5,671,130 A | 9/1997 | Kerkman et al. | |
| 5,736,825 A | 4/1998 | Kaura et al. | |
| 5,811,949 A | 9/1998 | Garces | |
| 5,912,813 A | 6/1999 | Kerkman et al. | |
| 5,990,658 A | 11/1999 | Kerkman et al. | |
| 6,014,497 A | 1/2000 | Kerkman et al. | |
| 6,023,417 A | 2/2000 | Hava et al. | |
| 6,359,416 B1 | 3/2002 | Rao et al. | |
| 6,469,916 B1 | 10/2002 | Kerkman et al. | |
| 6,477,067 B1 | 11/2002 | Kerkman et al. | |
| 6,541,933 B1 | 4/2003 | Leggate et al. | |
| 6,617,821 B2 | 9/2003 | Kerkman et al. | |
| 6,636,012 B2 | 10/2003 | Royak et al. | |
| 6,703,809 B2 | 3/2004 | Royak et al. | |
| 6,720,748 B1 | 4/2004 | Seibel et al. | |
| 6,819,070 B2 | 11/2004 | Kerkman et al. | |
| 6,819,077 B1 | 11/2004 | Seibel et al. | |
| 6,842,354 B1 | 1/2005 | Tallam et al. | |
| 6,982,533 B2 | 1/2006 | Seibrl | |
| 7,034,501 B1 | 4/2006 | Thunes et al. | |
| 7,106,025 B1 | 9/2006 | Yin et al. | |
| 7,164,254 B2 * | 1/2007 | Kerkman et al. | 318/812 |
| 7,215,559 B2 | 5/2007 | Nondahl et al. | |
| 7,336,509 B2 | 2/2008 | Tallam | |

(Continued)

OTHER PUBLICATIONS

Taiwan Patent Publication TW439350, Jun. 7, 2001.

(Continued)

*Primary Examiner* — Adolf Berhane
*Assistant Examiner* — Lakaisha Jackson
(74) *Attorney, Agent, or Firm* — Fay Sharpe LLP; Alexander Kuszewski; John M. Miller

(57) ABSTRACT

Power conversion systems and methods are provided for operating a multi-phase inverter to drive a load while mitigating reflected waves, in which one or more PWM modulating signals are selectively adjusted if at least one of the phase signals or values is transitioning into or out of an over-modulation range outside a pulse width modulation carrier waveform range.

27 Claims, 15 Drawing Sheets

U.S. PATENT DOCUMENTS

| | | | |
|---|---|---|---|
| 7,342,380 | B1 | 3/2008 | Kerkman et al. |
| 7,356,441 | B2 | 4/2008 | Kerkman |
| 7,400,518 | B2 * | 7/2008 | Yin et al. ................ 363/41 |
| 7,471,525 | B2 | 12/2008 | Suzuki et al. |
| 7,577,007 | B2 * | 8/2009 | Mori et al. ............... 363/71 |
| 7,738,267 | B1 * | 6/2010 | Tallam et al. ............. 363/35 |
| 7,835,165 | B2 * | 11/2010 | Hatanaka ................. 363/69 |
| 2007/0152676 | A1 * | 7/2007 | Lee ........................ 324/522 |
| 2010/0259207 | A1 * | 10/2010 | Kitanaka .............. 318/400.17 |

OTHER PUBLICATIONS

Emre Un and Ahmet M. Hava, "A Near State PWM Method With Reduced Switching Frequency and Reduced Common Mode Voltage for Three-Phase Voltage Source Inverters", 2007 IEEE.

A.M.De Broe, A.L. Julian, and T.A. Lipo, "Neutral-To-Ground Voltage Minimization in a PWM-Rectifier/Inverter Configuration", Power Electronics and Variable Speed Drives, Sep. 23-25, 1996, Conference Publication No. 429, IEEE, 1996.

Jay M. Erdman, Russel J. Kerkman, David W. Schlegel, and Gary L. Skibinski, "Effect of PWM Inverters on AC Motor Bearing Currents and Shaft Voltages", 1996 IEEE.

A. Muetze & A. Binder, "Don't Lose Your Bearings", Mitigation techniques for bearing currents in inverter-supplied drive systems, 2006 IEEE.

Yeb-Shin Lai and Fu-San Shyu, "Optimal Common-Mode Voltage Reduction PWM Technique for Inverter Control with Consideration of the Dead-Time Effects—Part I: Basic Development", 2004 IEEE.

Qiang Yin, Russel J. Kerkman, Thomas A. Nondahl, and Haihui Lu, "Analytical Investigation of the Switching Frequency Harmonic characteristic for Common Mode Reduction Modulator", 2005 IEEE.

Russel J. Kerkman, David Leggate, Dave Schlegel, and Gary Skibinski, "PWM Inverters and Their Influence on Motor Over-Voltage", 1997 IEEE.

Emre Un and Ahmet M. Hava, "A High Performance PWM Algorithm for Common Mode Voltage Reduction in Three-Phase Voltage Source Inverters", 2008 IEEE.

* cited by examiner

164a

OVER-MODULATION COMPENSATION RULE(S)

RULE 1:

1A - DO NOT ALLOW TRANSITION TO/FROM '1' FROM/TO THE BAND $\{1-2\varepsilon, 1-\varepsilon\}$
  (I) FOR PEAK SAMPLING OR PEAK & VALLEY SAMPLING AT VALLEY PRECEDING PEAK
  (II) TRANSITION TO $1-2\varepsilon$ AND COMPENSATE IN THE NEXT CYCLE 1B - DO NOT ALLOW TRANSITION TO/FROM '0' FROM/TO THE BAND $\{\varepsilon, 2\varepsilon\}$
  (I) FOR VALLEY SAMPLING OR PEAK & VALLEY SAMPLING AT PEAK PRECEDING VALLEY
  (II) TRANSITION TO $2\varepsilon$ AND COMPENSATE IN THE NEXT CYCLE

RULE 2:

2A - IF A PHASE'S PREVIOUS DUTY CYCLE IS IN THE RANGE $\{1-2\varepsilon, 1-\varepsilon\}$, DO NOT ALLOW ANOTHER PHASE TO TRANSITION TO/FROM '1'
  (I) SET ITS DUTY CYCLE TO $1-2\varepsilon$ FOR TRANSITION TO '1' OR HOLD AT '1' FOR TRANSITION FROM '1' AND COMPENSATE IN THE NEXT CYCLE 2B - IF A PHASE'S PREVIOUS DUTY CYCLE IS IN THE RANGE $\{\varepsilon, 2\varepsilon\}$, DO NOT ALLOW ANOTHER PHASE TO TRANSITION TO/FROM '0'
  (I) SET ITS DUTY CYCLE TO $2\varepsilon$ FOR TRANSITION TO '0' OR HOLD AT '0' FOR TRANSITION FROM '0' AND COMPENSATE IN THE NEXT CYCLE RULE 3:
ALLOW ONLY ONE PHASE TO TRANSITION TO/FROM OVER-MODULATION, CONSISTENT WITH RULES 1 & 2

FIG. 1E

PULSE WIDTH MODULATION CONTROL METHOD AND SYSTEM FOR MITIGATING REFLECTED WAVE EFFECTS IN OVER-MODULATION REGION

BACKGROUND

Motor drives and other forms of power conversion systems convert electrical power from one form to another and may be employed in a variety of applications such as powering an electric motor using power converted from a single or multiphase AC input source, converting AC power from a wind driven generator to supply power to a grid, etc. Power converters may include multiple stages for different types of conversion applications, such as AC/DC/AC drives for electric motors having a pulse width modulated (PWM) active current source rectifier in which AC input power is selectively switched to create a DC output bus voltage from which a load is driven by a PWM controlled inverter stage. This type of converter is particularly useful in driving electric motors in industrial applications requiring variable speed control with varying motor load situations. The inverter typically employs a pair of high/low drivers for each output phase for selectively coupling the output line with one either the upper or lower DC bus line, where semiconductor-based switches such as silicon controlled rectifiers (SCRs), gate turn-off thyristors (GTOs), gate commutated thyristors (GCTs such as integrated gate commutated thyristors (IGCTs) or symmetrical gate commutated thyristors (SGCTs)), etc. are typically used to implement the inverter switching at relatively high frequencies.

Many pulse width modulation schemes for motor drive applications employ minimum dwell and polarity reversal times in the inverter to limit motor peak voltage up to a certain desired value of lead length, where the dwell time describes the minimum time that any switch remains in the on or off state and the polarity reversal time is the minimum time that the output line-line voltage is held at zero when transitioning from positive polarity to negative polarity or vice-versa. A variety of pulse width modulation schemes have been developed to address excessive motor voltages, reflected wave effects, and common mode voltage problems in motor drive converters.

U.S. Pat. No. 7,034,501 to Thunes et al., issued Apr. 25, 2006 and assigned to the assignee of the present application describes spacing modulating signals at low speed to prevent overvoltages through reflected waves in a current regulated drive, in which volt-second distortion is compensated by the current regulator. The entirety of this patent is hereby incorporated by reference as if hilly set forth herein.

U.S. Pat. No. 7,164,254 to Kerkman et al., issued Jan. 16, 2007 and also assigned to the assignee of the present application discloses common mode voltage reduction techniques in which the switching sequence is modified to avoid using the zero vectors so as to reduce common mode voltages in the motor. The entirety of this patent is hereby incorporated by reference as if fully set forth herein.

U.S. Pat. No. 7,106,025 to Yin et al., issued Sep. 12, 2006 and assigned to the assignee of the present application discloses techniques for canceling dead time effects in the algorithm to reduce common mode voltages produced by a three-phase power conversion device in a rectifier/inverter variable frequency drive (VFD), the entirety of which is hereby incorporated by reference as if fully set forth herein.

U.S. Pat. No. 7,034,501 to Thunes et al., issued Apr. 25, 2007 and assigned to the assignee of the present application discloses gate pulse time interval adjustment techniques for mitigating reflected waves in AC motor drives, the entirety of which is hereby incorporated by reference as if fully set forth herein.

Co-pending U.S. patent application Ser. Nos. 12/394,613, filed Feb. 27, 2009, and 12/429,309, filed Apr. 24, 2009, both assigned to the assignee of the present application, both of which are hereby incorporated by reference as if fully set forth herein, disclose controlling common mode voltages in AC motor loads using switching sequences with only active vectors, but this can increase output current distortion, particularly at low speeds and the method may not be easily implemented in all PWM waveform generators.

U.S. Pat. No. 6,819,070 to Kerkman et al., issued Nov. 16, 2004 and assigned to the assignee of the present application discloses inverter switching control techniques to control reflected voltages in AC motor drives, the entirety of which is hereby incorporated by reference as if fully set forth herein. This patent describes method to adjust gate pulses to minimize peak motor over-voltage due to the reflected wave phenomenon. These techniques involve enforcing minimum dwell times and preventing polarity reversal in the line-line voltage applied to the motor by limiting the minimum and maximum value of the duty cycle for each phase independently. When not in pulse-dropping, limiting the maximum and minimum duty cycles of the phases independently enforces dwell time and polarity reversal time in the PWM switching pattern, and peak motor over-voltage is limited when not in pulse dropping. However, the dwell time can be reduced during transition to over-modulation conditions when the modulating waveform of the PWM scheme exceeds the maximum value of the carrier waveform or when the modulating waveform goes below the minimum carrier waveform value, leading to high voltage at the motor terminals. In addition, the polarity reversal time can be reduced during transitions to over-modulation, also causing high motor terminal voltages. Moreover, simultaneous transitions to or from over-modulation on two phases can result in polarity reversals, potentially generating very high voltages (e.g., up to about four times the DC bus level) at the motor terminals, even for short cable lengths. Thus, there is a need for improved inverter pulse width modulation techniques and systems to avoid or mitigate these problems in over-modulation situations.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. The present disclosure relates to inverter pulse width modulation techniques in which PWM modulating signals are selectively adjusted if one or more phase signals or values is transitioning into or out of an over-modulation range outside the range of the pulse width modulation carrier waveform to mitigate reflected waves.

A power conversion system is provided, which includes an inverter supplying multi-phase AC output power to a load, as well as a switch control system providing pulse width modulated switching control signals to switching devices of the inverter. The switch control system includes a pulse width modulation system that provides control signals based on a carrier waveform and a set of phase signals or values individually corresponding to a load phase. The carrier waveform has a carrier waveform range extending from a maximum value to a minimum value, and the carrier range includes first and second bands spaced from and between the carrier maximum and minimum values. The switch control system also includes an over-modulation compensation component which selectively adjusts one or more phase signals or values to provide a set of over-modulation compensated phase signals or values if at least one of the phase signals or values is transitioning into or out of an over-modulation range outside the carrier waveform range in a current sample cycle. The compensated phase signals or values are used by the pulse width modulation system to provide the inverter switching control signals. If a given phase signal or value transitions between the carrier maximum value and the first band, the over-modulation compensation component adjusts the signal or value to the lower first band value, and if the phase signal or value transitions between the carrier minimum value and the second band, the compensation component adjusts the signal or value to the upper second band value.

In certain embodiments, the first band has an upper first band value spaced from and below the carrier maximum value by an offset amount ϵ, where the first band range is equal to the offset amount, where the a second band has a lower second band value spaced from and above the carrier minimum value by the offset amount, and where the second band range is equal to the offset amount.

In certain embodiments, the over-modulation compensation component is operative, if a first phase signal or value is in the first range and a second phase signal or value transitions to the carrier maximum value, to adjust the second phase signal or value to the lower first band value, and if the first phase signal or value is in the first range and the second phase signal or value transitions from the carrier maximum value, the compensation component adjusts the second phase signal or value to remain at the carrier maximum value. In addition, if the first phase signal or value is in the second range and the second phase signal or value transitions to the carrier minimum value, the compensation component adjusts the second phase signal or value to the upper second band value, and if the first phase signal or value is in the second range and the second phase signal or value transitions from the carrier minimum value, the compensation component adjusts the second phase signal or value to remain at the carrier minimum value.

In certain embodiments, the over-modulation compensation component is operative if two phase signals or values are transitioning to or from the carrier maximum value or are transitioning to or from the carrier minimum value, to adjust one of the two phase signals or values to remain at its previous level.

In certain embodiments, moreover, the over-modulation compensation component makes a compensating adjustment to a given phase signal or value in a subsequent pulse width modulation period if the signal or value was adjusted in a prior pulse width modulation period.

A method is provided for operating a pulse width modulated inverter to convert DC power to multi-phase AC output power. A set of phase signals or values is determined according to one or more setpoint signals or values and according to feedback signals or values individually corresponding to voltages or currents of the load phases. The method also includes selectively adjusting at least one phase signal or value in a given pulse width modulation period to provide a set of over-modulation compensated phase signals or values if at least one of the phase signals or values is transitioning into or out of an over-modulation range in a current sample cycle, as well as generating pulse width modulated inverter switching control signals according to a carrier waveform and the compensated phase signals or values.

The carrier waveform range in certain embodiments includes a first band with a lower first band value and a first band range offset from and below the carrier maximum value and a second band with an upper second band value and a second band range offset from and above the carrier minimum value, where the first band is spaced from and above the second band.

In certain embodiments, if a given phase signal or value transitions between the carrier maximum value and the first band, the selective adjustment of phase signal(s) or value(s) includes adjusting the given phase signal or value to the lower first band value, and if the signal or value transitions between the carrier minimum value and the second band, it is adjusted to the upper second band value.

In certain embodiments, if a first phase signal or value is in the first range and a second phase signal or value transitions to the carrier maximum value, the selective adjustment of phase signal(s) or value(s) includes adjusting the second phase signal or value to the lower first band value, and if the first phase signal or value is in the first range and the second phase signal or value transitions from the carrier maximum value, the second phase signal or value is adjusted to remain at the carrier maximum value. In addition, if the first phase signal or value is in the second range and the second phase signal or value transitions to the carrier minimum value, the selective adjustment of phase signal(s) or value(s) includes adjusting the second phase signal or value to the upper second band value, and if the first phase signal or value is in the second range and the second phase signal or value transitions from the carrier minimum value, the second phase signal or value is adjusted to remain at the carrier minimum value.

In certain embodiments, if two phase signals or values are transitioning to or from the carrier maximum value or are transitioning to or from the carrier minimum value, one of the two is adjusted to remain at its previous level.

In certain embodiments, moreover, if a given phase signal or value is adjusted in one pulse width modulation period, a compensating adjustment is made to that phase signal or value in a subsequent pulse width modulation period.

A non-transitory computer readable medium is provided, having computer-executable instructions for operating a pulse width modulated inverter to convert DC power to multi-phase AC output power. The computer readable medium includes computer-executable instructions for determining a set of phase signals or values individually corresponding to a load phase associated with AC output terminals of the inverter based on at least one setpoint signal or value and on feedback signals or values individually corresponding to voltages or currents of the load phases. Further computer-executable instructions are provided for selectively adjusting at least one phase signal or value in a given pulse width modulation period to provide a set of over-modulation compensated phase signals or values if at least one of the phase signals or values is transitioning into or out of an over-modulation range outside a pulse width modulation carrier waveform range in a current sample cycle. In addition, the medium includes computer-executable instructions for generating inverter switching control signals by pulse width modulation according to a carrier waveform and the set of over-modulation compensated phase signals or values.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 1E is a partial schematic diagram illustrating an exemplary rule set for over-modulation compensation in the switch control systems of FIGS. 1A-1D;

DETAILED DESCRIPTION

Figure 1A:
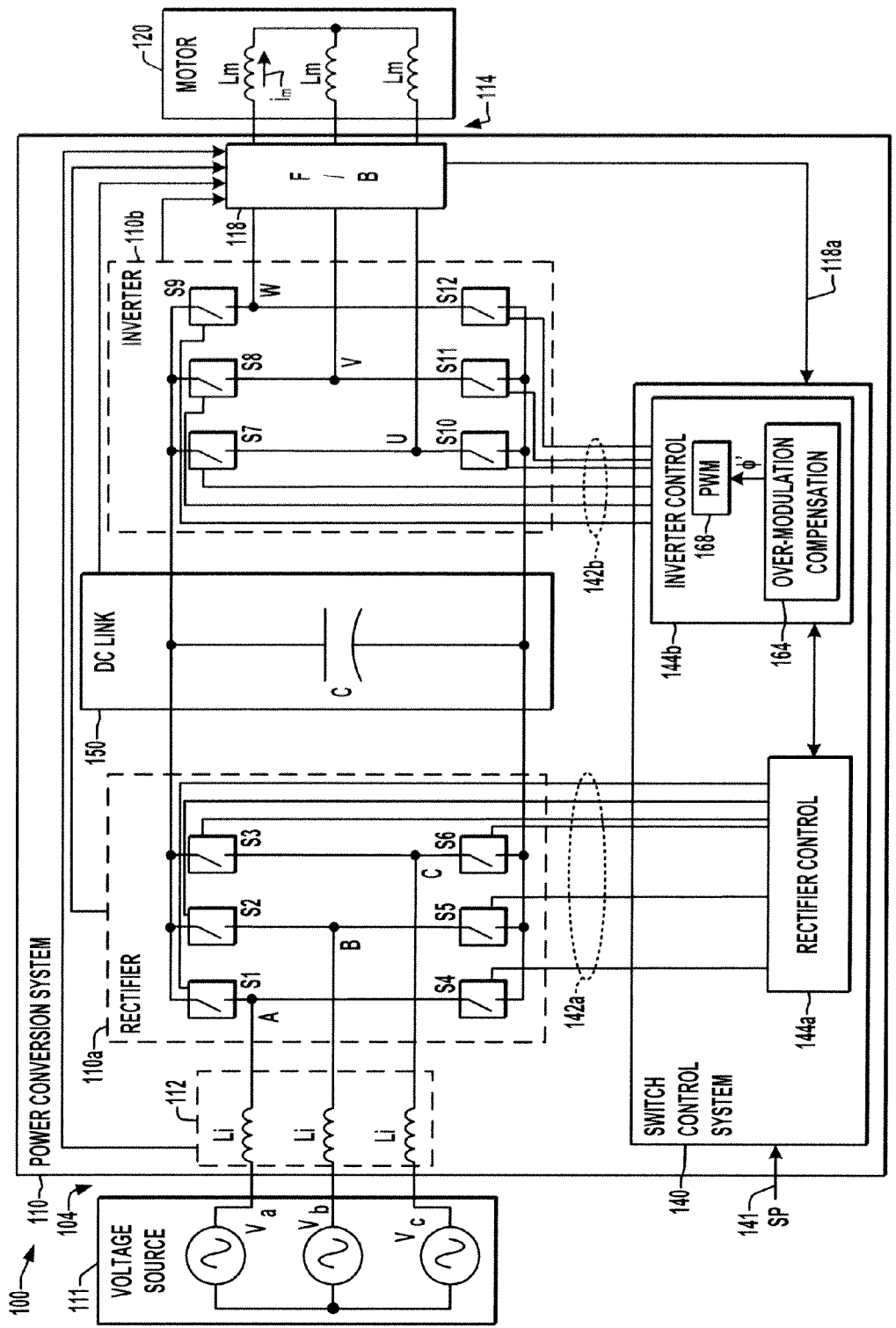
FIGS. 1A and 1B are schematic diagrams illustrating exemplary voltage source converter type variable frequency motor drives with inverter switch control systems implementing reflected wave reduction by compensation for over-modulation conditions in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale.

Referring initially to FIGS. 1A-1E, pulse width modulation techniques are hereinafter illustrated and described in the context of various exemplary motor drive systems 100 in which multi-phase inverters 110b provide AC output currents and voltages to motor loads 120, although the disclosed concepts are applicable to any form of power conversion system in which PWM actuated inverters are used to provide multi-phase output power. In motor drives 110 and other power converters, an important design consideration is the reduction or avoidance of excessive voltages at the motor load 120. The inventors have appreciated that certain aspects of pulse width modulation in generating inverter control signals can affect the switching pulse timing during periods of over-modulation, leading to reflected waves and potentially excessive motor voltages. Accordingly, the described systems address these problems by selectively adjusting one or more PWM modulating waveform signals or values (referred to herein as phase signals or values) if one or more of the phase signals or values is transitioning in a current PWM cycle into or out of an over-modulation range. In this regard, over-modulation conditions occur when at least one of the phase signals or values is outside the range of the pulse width modulation carrier waveform, i.e., above the carrier peak value or below the carrier minimum (valley). As previously mentioned, U.S. Pat. No. 6,819,070 to Kerkman et al., incorporated herein by reference, discloses inverter switching control techniques to control reflected voltages in AC motor drives by adjusting gate pulses to enforce minimum dwell times for each phase independently, which can address these problems during linear modulation conditions (where the phase values are within the PWM carrier waveform range). However, this technique alone cannot prevent the above mentioned difficulties in over-modulation situations.

The illustrated motor drives 110 provide inverter switching controls with over-modulation compensation components to selectively adjust one or more phase signals or values in a given PWM period ($T_{PWM}$) to provide a set of over-modulation compensated phase signals or values when one or more of the phase signals or values is transitioning into or out of an over-modulation range that is outside a pulse width modulation carrier waveform range in a current sample cycle. The exemplary embodiments illustrate these concepts in implementations using synchronous sampling where the motor voltages are sensed and fed back to the controller, and the control algorithm updates the phase signals or values accordingly at one or both of the carrier signal peak and/or valley, whereby at each such sampling update, the present value will typically be a step-change relative to the corresponding value used in the preceding PWM cycle. In practice, moreover, the PWM modulating waveforms can be electrical, optical, or other signals, for instance having analog forms, and/or these may be values representing the levels of a theoretically continuous phase waveform, such as sinusoidal motor voltages or currents, and the PWM controls can operate on either or both signals and/or values. In addition, the illustrated techniques can be used in conjunction with any form of PWM switching signal generation apparatus, such as direct digital pulse width modulation controls performing the comparison of carrier waveform values (or signals) with modulating waveform values using processor-executed software, processor-executed firmware, hardware, logic, and/or combinations thereof (e.g., FIG. 1C), as well as carrier-based PWM system (FIG. 1D) having on-board carrier-wave generators 168a and comparator circuitry 168b. Moreover, which illustrated and described in systems using triangle carrier waveforms 202, other carrier waveform shapes can be used. In this regard, an exemplary triangle waveform 202 is used as a carrier waveform in the illustrated examples, having a carrier waveform period $T_{PWM}$ in certain embodiments of about 256 or 512 μs. The exemplary carrier waveform has a peak or maximal value (1) and a valley or minimal value (0).

Figure 1B:
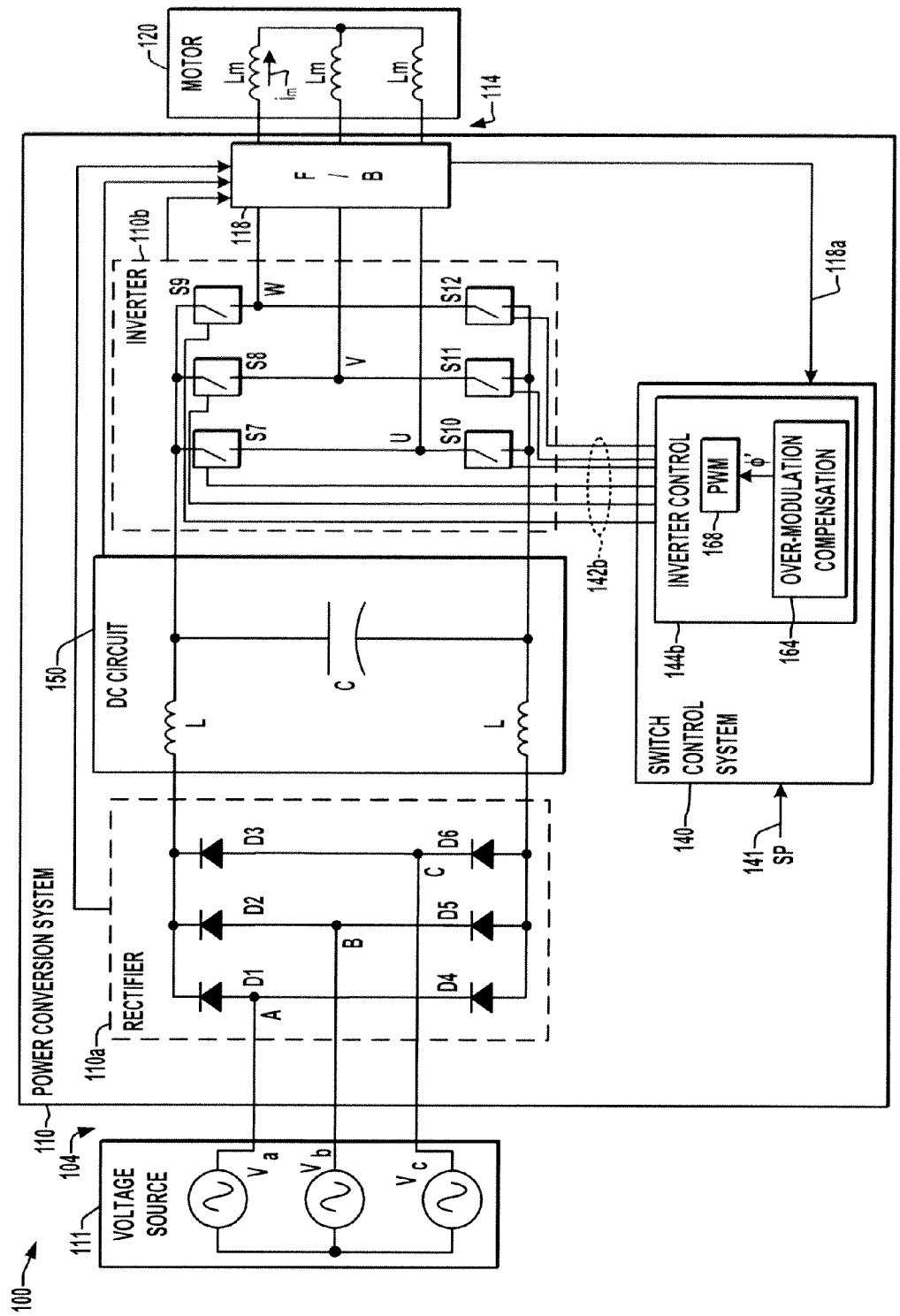
Figure 2A:
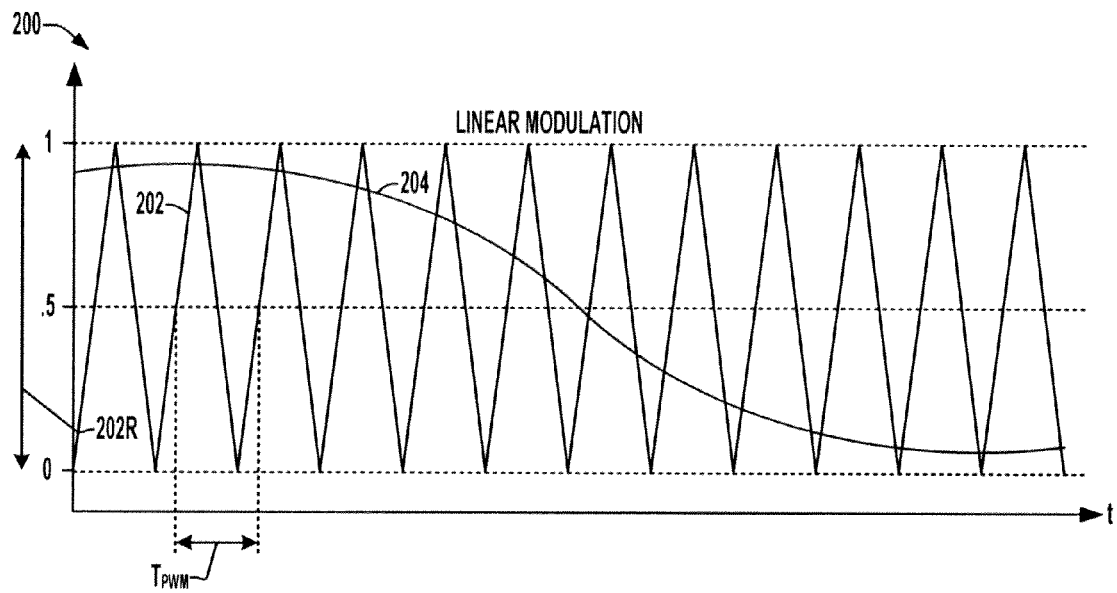
FIG. 2A is a waveform diagram illustrating an exemplary single phase pulse width modulation implementation in a linear modulation mode where the modulating waveform remains within the maximum and minimum values of the carrier waveform.
Figure 2B:
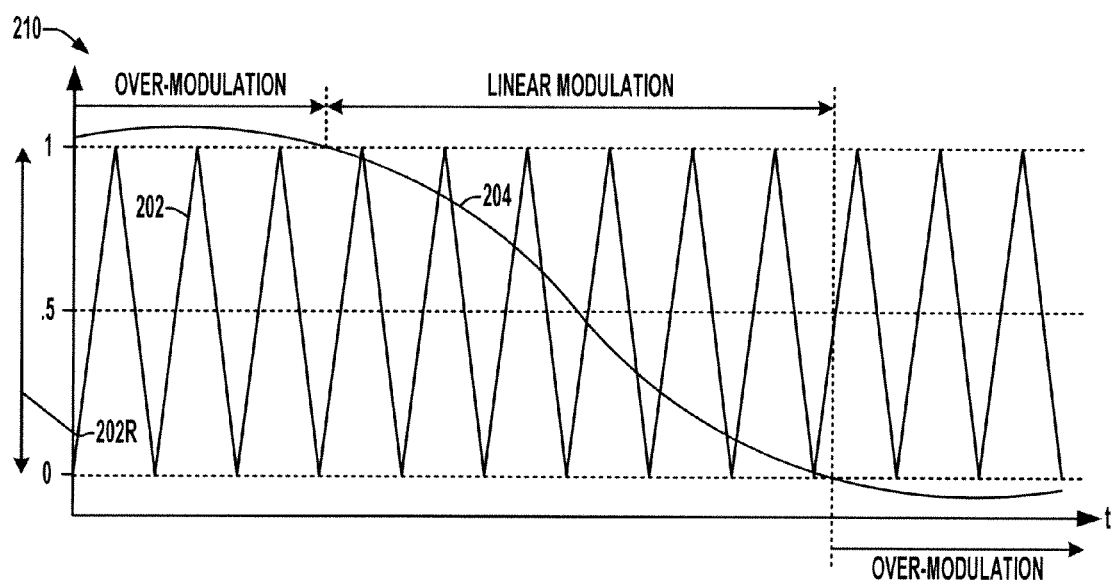
FIG. 2B is a waveform diagram illustrating an over-modulation condition in the pulse width modulation implementation in which the modulating waveform transitions above the maximum carrier waveform amplitude and also transitions below the carrier minimum value.
Figure 2C:
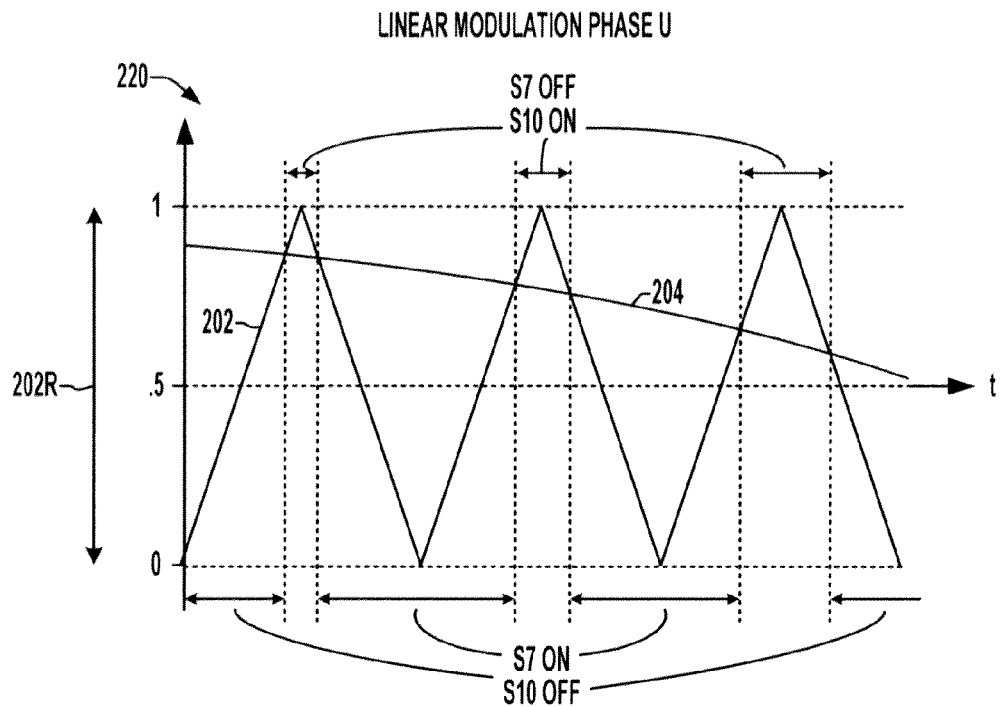
FIG. 2C is a waveform diagram illustrating exemplary switching operation for upper and lower switches of a single phase during linear-modulation.

As seen in FIGS. 2A-2G, during transition into and out of over-modulation, however, dwell time can be reduced by 50%, and undesirable quick polarity reversals can, either of which can cause motor over-voltages, particularly for low bus voltage, high modulation index, and high carrier frequency conditions. With respect to a given one of the plurality of output phases of a power conversion system inverter 110b, FIGS. 2A-2C depict typical switching configurations in which an upper switch (e.g., switch S7 in the inverters 110b of FIGS. 1A and 1B) can selectively couple the output phase line to an upper (e.g., positive) DC bus terminal and a lower switch (e.g., S10) can selectively couple the phase to a lower DC bus terminal. In the PWM waveform diagrams, the triangle wave carrier signal 202 has a period $T_{PWM}$ and a carrier waveform range 202R extending from a carrier maximum value "1" to a carrier minimum value "0". Other scaling can be used for the assignment of "values" to the PWM modulating and carrier waveforms, where linear-modulation occurs when the modulating waveform 204 is within the range 202R of the carrier 202 and over-modulation occurs when the modulating waveform 204 is outside the carrier range 202R. During normal linear-modulation operation (FIG. 2A), the modulating waveform 204 remains within the maximum and minimum values of the carrier waveform 202, whereas an over-modulation condition is seen in FIG. 2B where the phase signal 204 transitions above the maximum carrier waveform amplitude ("1") and also transitions below the carrier minimum value ("0"). As seen in FIG. 2C, for a phase "U" in linear-modulation, the upper switch S7 is turned ON (conductive) and the lower switch S10 is OFF (non-conductive) when the phase signal or value 204 (the modulating waveform) is above the carrier 204. Conversely, when the phase signal 204 is below the carrier 202, S7 is turned OFF and S10 is switched ON.

Figure 1C:
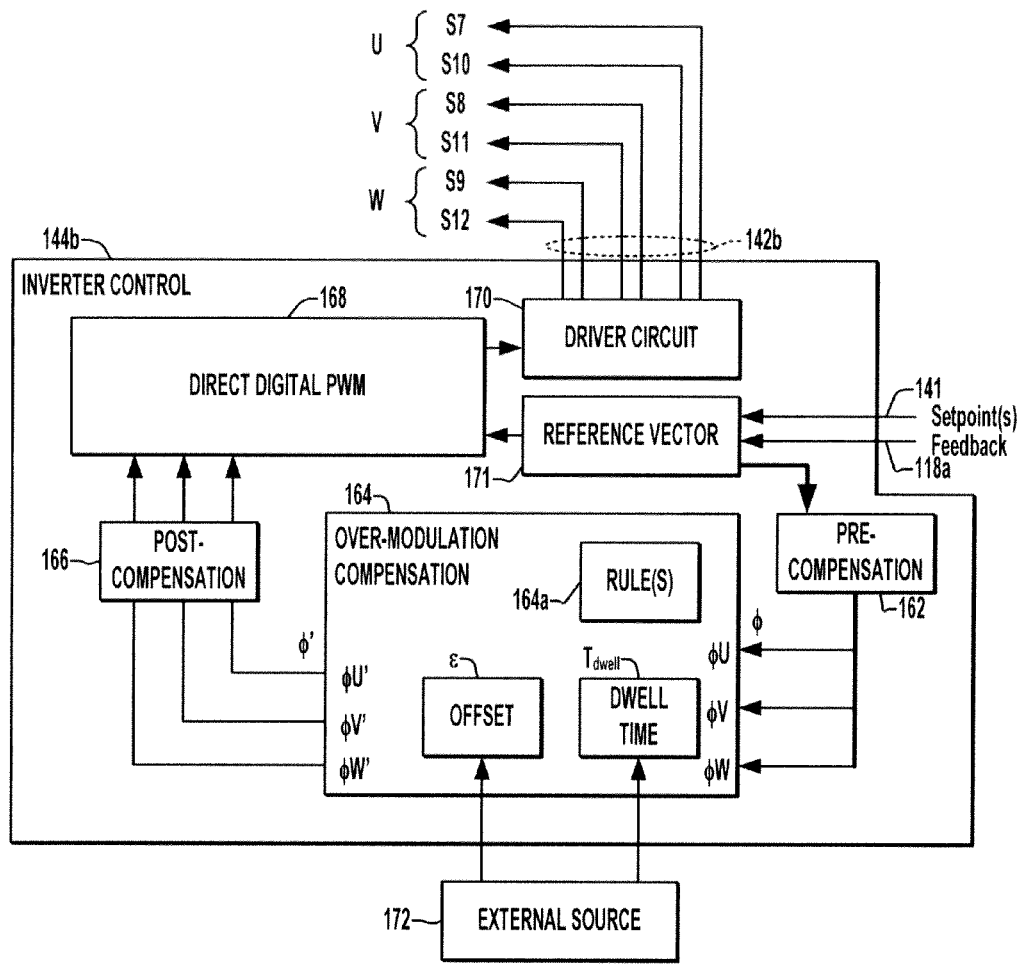
FIG. 1C is a partial schematic diagram illustrating an exemplary inverter switch control system of the motor drives of FIGS. 1A and 1B, implementing direct digital pulse width modulation with over-modulation compensation in accordance with the disclosure.
Figure 1D:
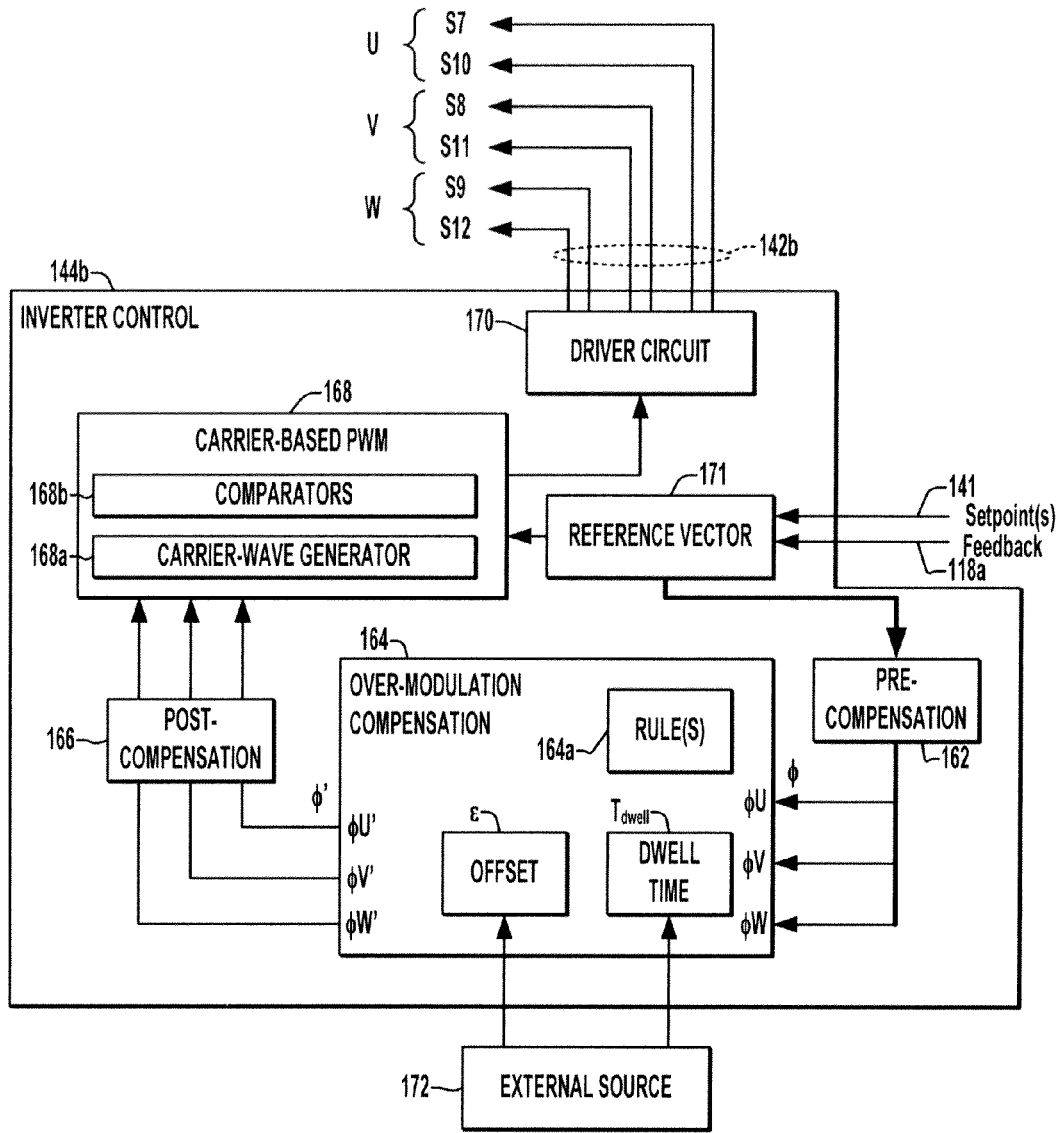
FIG. 1D is a schematic diagram illustrating another exemplary inverter switch control system implementing carrier-based, sine-triangle pulse width modulation with a carrier-wave generator and comparators using modulating signals selectively adjusted for reflected wave reduction in accordance with the disclosure.
Figure 2D:
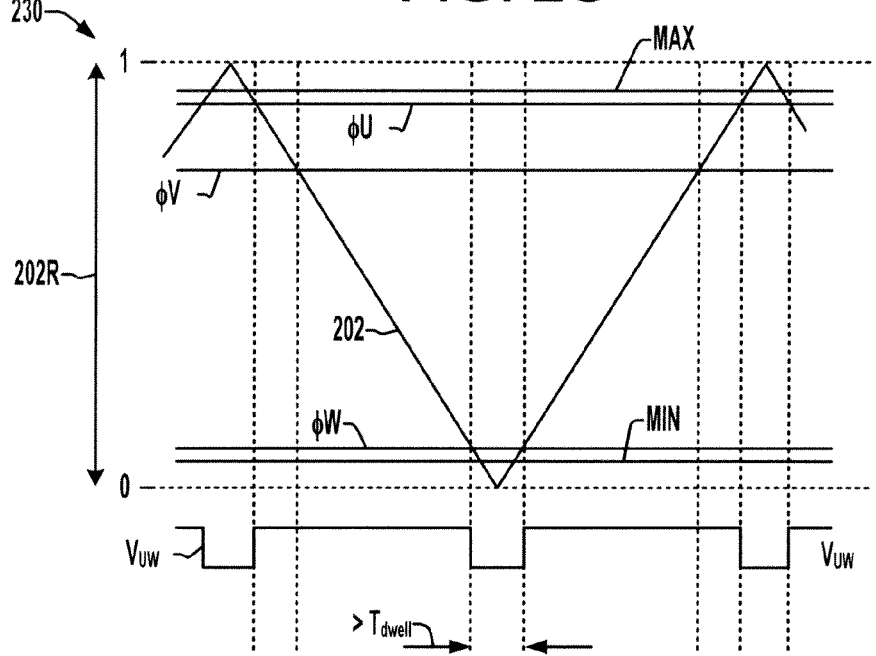
FIG. 2D is a waveform diagram illustrating pulse width modulation modulating waveforms for three exemplary phases with selective dwell time enforcement using maximum and minimum levels.

FIG. 2D shows compensation of the linear-modulation mode for three exemplary phases U, V, and W for selective dwell time enforcement using maximum and minimum levels "MAX" and "MIN", respectively, generally according to the technique described in U.S. Pat. No. 6,819,070 to Kerkman et al. As mentioned, this approach limits the dwell and phase reversal times to acceptable levels (e.g., a preset dwell time $T_{dwell}$ as seen in FIGS. 1C and 1D) for linear-modulation. In this regard, when not in pulse-dropping, limiting the maximum and minimum duty cycles (levels) of the phases U, V, and W independently by this technique enforces dwell time and polarity reversal time in the PWM switching pattern, and peak motor over-voltage is limited when not in pulse dropping.

Figure 2E:
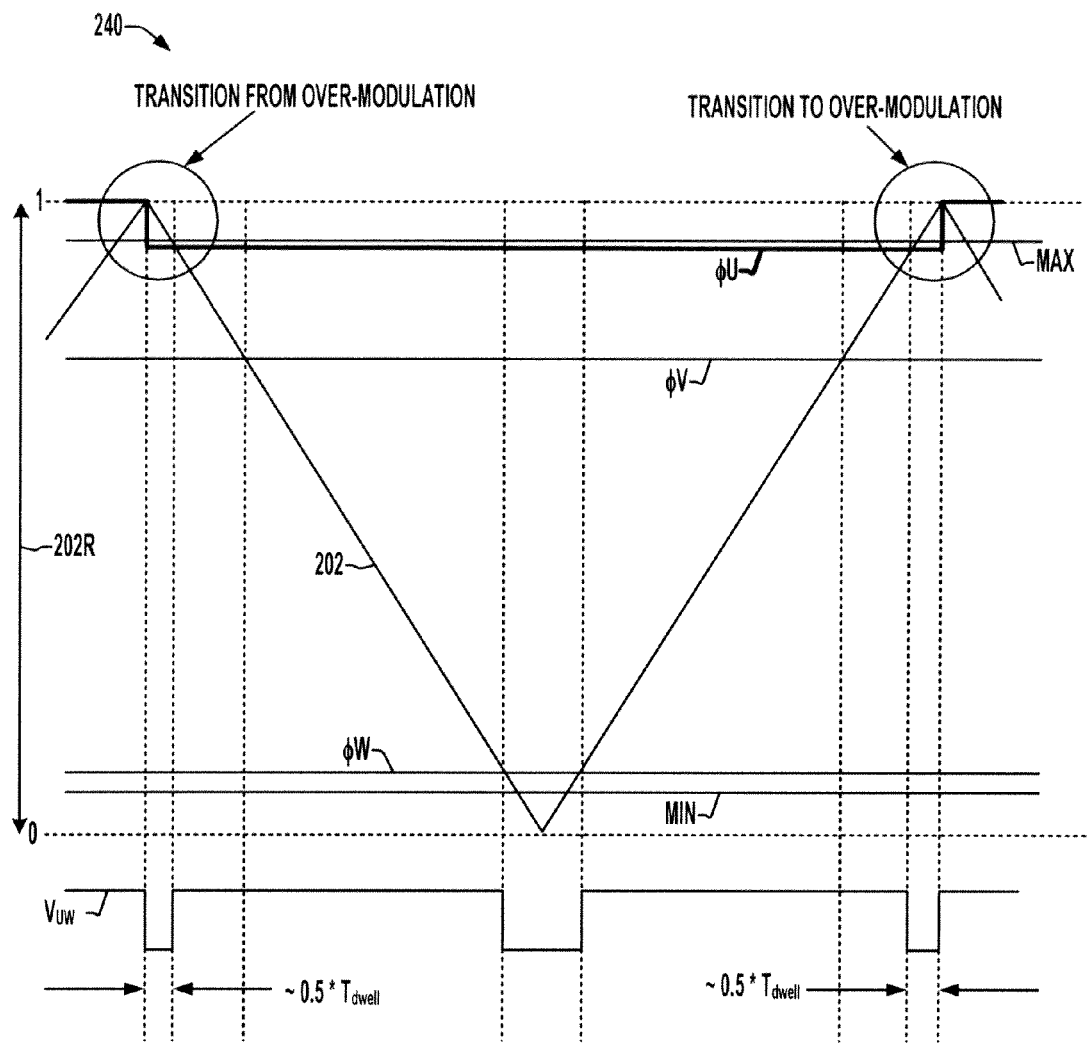
FIG. 2E is a pulse width modulation waveform diagram illustrating a condition in which transition of a phase from an over-modulation condition using the maximum and minimum level approach leads to line-to-line voltage pulses less than a desired minimum dwell time.
Figure 2F:
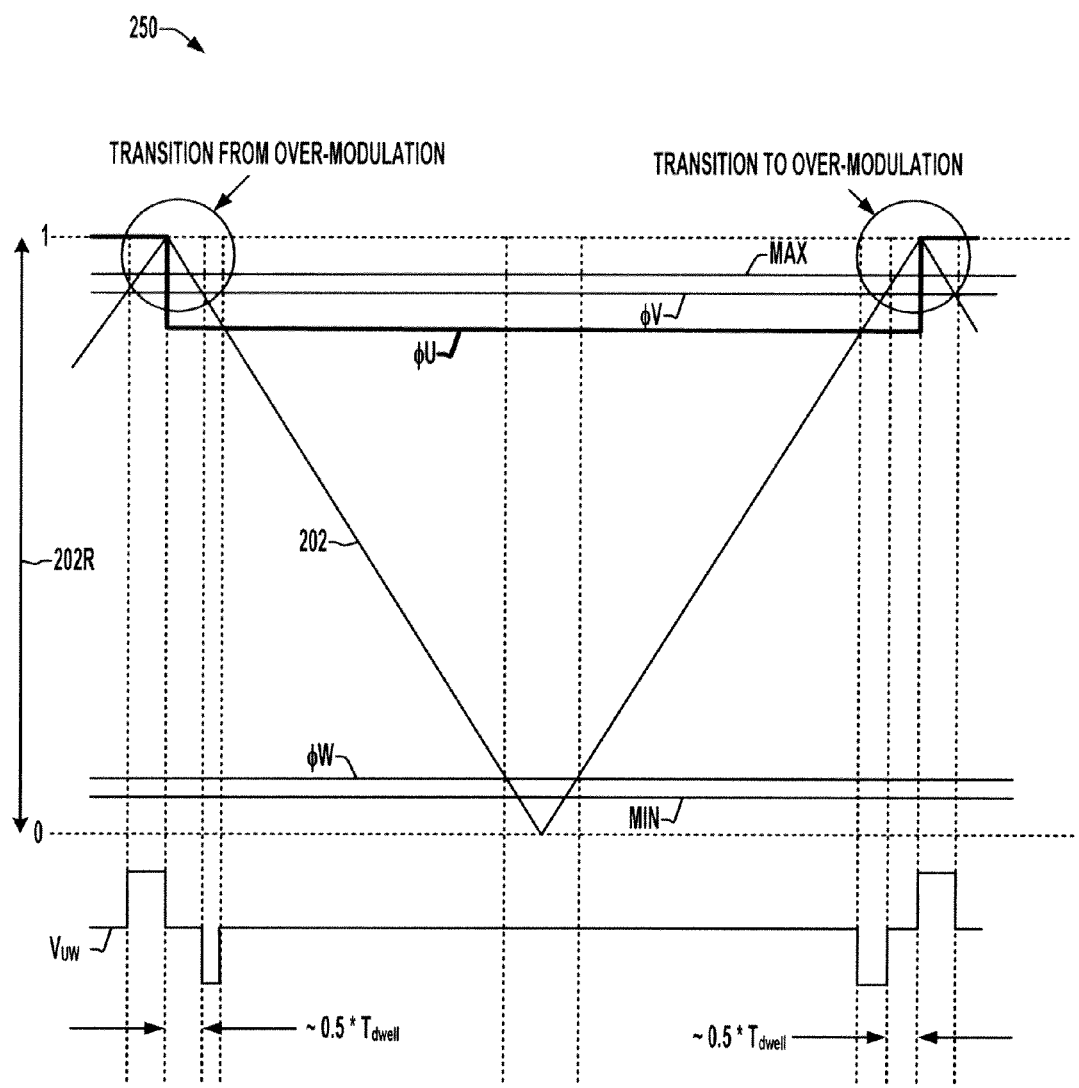
FIG. 2F is a pulse width modulation waveform diagram illustrating another over-modulation condition in which transition of a phase from an over-modulation condition with a second phase near the enforced maximum leads to fast line-line voltage phase reversal.
Figure 2G:
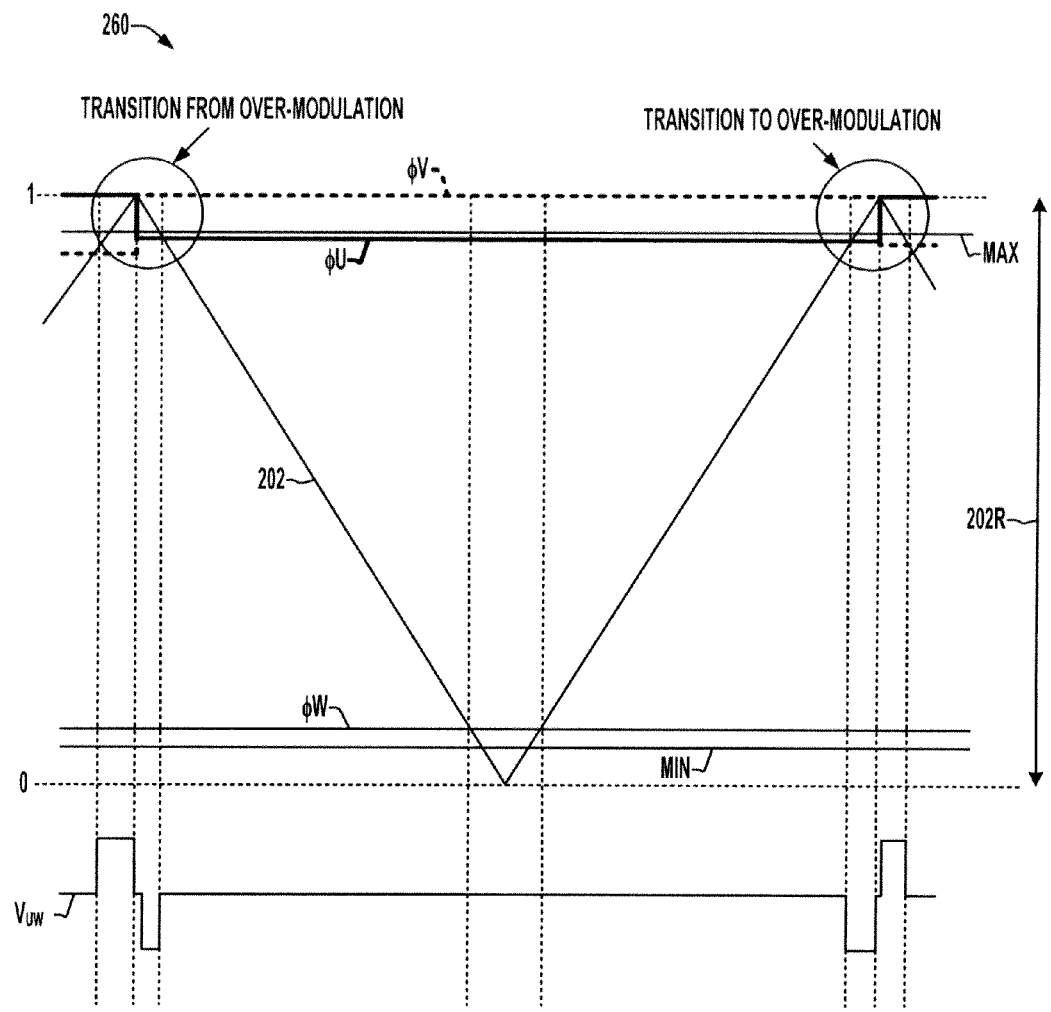
FIG. 2G is another exemplary pulse width modulation waveform diagram illustrating simultaneous transition of two phases to and from over-modulation leading to fast line-to-line polarity reversal.

Referring to FIGS. 2E-2G, however, the dwell time can be reduced below acceptable levels during transitions of an actual phase value to or from over-modulation conditions as seen in FIG. 2E, causing high motor voltages. In the situation of FIG. 2E (absent the innovations of the present disclosure), phase U transitions from above the carrier maximum value "1" (even if the controller effectively clips the signal or value ΦU to "1") to below MAX, the resulting line-to-line voltage $V_{UW}$ between phases U and W undergoes a low-going pulse of duration approximately half the desired dwell time $T_{dwell}$ otherwise enforced in linear modulation. As seen in the right portion of the diagram in FIG. 2E, the same occurs when phase U transitions from below MAX to the upper over-modulation condition. Similar problems are found in transitions to or from the lower over modulation range (below "0").

In addition, the polarity reversal time can be reduced during transitions to or from over-modulation as shown in FIG. 2F, and simultaneous transitions to or from over-modulation on two phases can result in fast polarity reversals (FIG. 2G), potentially generating very high voltages (e.g., up to about four times the DC bus level) at the motor terminals, even for short cable lengths. As seen in FIG. 2F, where phase U transitions from or to over-modulation to or from a region below MAX while another phase V is just below MAX, the phase reversal time is again less than $T_{dwell}$ (e.g., about $0.5T_{dwell}$ in one example). Polarity reversal time is also adversely affected when two phases U and V simultaneously transition to and from over-modulation as seen in FIG. 2G.

To address these shortcomings, FIGS. 1A-1E illustrated exemplary systems 100 and motor drive power conversion systems 110 thereof employing over-modulation compensation components 164 for selective phase signal or value adjustments during over-modulation transitions. An exemplary motor drive configuration 100 is illustrated in FIG. 1A, which includes a voltage source converter type motor drive 110 driving a motor load 120. While FIG. 1A illustrates a voltage source converter 110 with an active rectifier 110a, other embodiments are possible using a passive rectifier 110a as shown in FIG. 1B. The system 100 of FIG. 1A includes an input 104 coupled with a three-phase AC voltage source 111 providing input power to the drive 110, and the drive 110 converts the input power to provide motor voltages to drive a motor load 120 having phase windings with associated inductances Lm coupled to a converter output 114. The drive 110 may include an input filter 112 connected to the AC power source 111. While these examples are illustrated as having a three phase input 112, other embodiments may provide a single phase AC input or may include a multiphase input adapted to receive three or more input phases. The drive 110 in FIG. 1A provides variable frequency, variable amplitude single or multiphase AC output power at output terminals 114 to drive an AC motor load 120, which has three phase windings in the illustrated example. The output 114 in other embodiments may be of any number of phases, and may power a load other than a motor, such as a power grid in a wind energy system, for example. The motor drive 110 may include input filter capacitors in the input circuit 112, as well as output filter capacitors in an output filter circuit (not shown).

The drive 110 includes a rectifier 110a receiving the AC input power from the source 111 via an input 112, as well as an intermediate DC circuit 150 with a capacitance C (single or multiple capacitors) connected between the upper and lower DC branches. The rectifier 110a is coupled with the inverter 110b by the intermediate DC circuit 150, and one or more isolation components (e.g., transformers, not shown) may optionally be included in the drive 110. The output 114 provides AC electrical output power to the motor load 120 via lines U, V, and W.

The rectifier 110a is an active switching-type rectifier with switching devices S1-S6 coupled between the input 112 and the DC circuit 150 and operates according to a plurality of rectifier switching control signals 142a provided by a rectifier control component 144a of a switch control system 140. In operation, the AC input power is switched by the rectifier switches S1-S6 to create an intermediate DC bus voltage in the intermediate circuit 150. The exemplary inverter 110b includes switching devices S7-S12 coupled between the DC circuit 150 and phase lines U, V, and W of the output 114. The inverter switches S7-S12 are operated according to corresponding switching control signals 142b from an inverter control component 144b of the switch control system 140 to selectively convert DC power from the DC circuit 150 to provide the AC output power to drive the motor load 120.

The rectifier and inverter switching devices S1-S12 may be any suitable controllable electrical switch types (e.g., SGCTs, IGCTs, GTOs, thyristors, IGBTs, etc.) that are controlled according to any suitable type or form of switching scheme or schemes, such as phase control, pulse width modulation, etc., in open or closed-loop fashion. In certain embodiments, the switching devices S7-S12 of the inverter 110b are forced commutated devices including without limitation SGCTs, IGBTs or GTOs, and the switching devices S1-S6 of the rectifier 110a can be force commutated devices such as those mentioned above as well as line commutated devices such as Thyristors. In this regard, Thyristor devices could be used for the inverter switching devices S7-S12 in the form of forced commutated devices with extra circuitry added to the device triggering circuit, triggering circuit commutation.

The rectifier 110a and the inverter 110b operate under control of the switch control system 140, which may include one or more processors and associated memory as well as I/O circuits including driver circuitry for generating switching control signals 142 to selectively actuate the switching devices S1-S12 although separate switching control systems may be employed, for example, with interconnections and information sharing to facilitate the coordinated operation of the rectifier 110a and the inverter 110b. The switch control system 140 in these embodiments includes an inverter control component 144b providing the inverter switching control signals 142b to cause the inverter 110b to selectively convert DC voltage from the intermediate DC circuit 150 to provide AC electrical power to the AC output 114 according to one or more setpoints 141, such as desired motor speed, torque, etc. The switch control system 140 and the components 144 thereof can be implemented as any suitable hardware, processor-executed software, processor-executed firmware, programmable logic, or combinations thereof operative as any suitable controller or regulator by which the motor 120 is controlled according to one or more desired profile(s) or setpoint(s) 141, whether signals and/or digital values, in open or closed-loop fashion or combinations thereof.

In operation, moreover, a rectifier control component 144a of the controller 140 provides the rectifier switching control signals 142a to cause the rectifier 110a to convert AC electrical input power to provide a regulated DC voltage to the DC circuit 150. In doing so, the rectifier controller 144a may employ one or more feedback signals or values 118a, such as a measured DC voltage value from the rectifier 110a representing the actual DC link voltage. The DC voltage from the rectifier 110a provides an input to the inverter 110b, where the exemplary inverter control 144b may provide a desired DC link voltage signal or value as a regulation setpoint to the rectifier controller 144a. In this manner, the rectifier 110a provides the DC voltage required by the inverter 110b, and the rectifier controller 144a may also implement other control functions such as power factor correction, while the inverter controller 144b performs the necessary motor control operation of the drive 110 according to one or more setpoint values or signals 141.

The drive 110 also includes a feedback system 118 including one or more sensing elements operative to provide one or more feedback signals and/or values 118a indicative of electrical conditions at the input 112, the rectifier 110a, the intermediate DC circuit 150, the inverter 110b, and/or at the output 114. The switch control system 140 may be provided with one or more setpoints or desired values 141 and one or more feedback signals or values 118a from the feedback system 118 by which one or more closed loop motor drive control goals are achieved in normal motor drive operation. Feedback signals or values for the control functions can be based on signals and/or values 118a from the feedback system 118, measured input values (e.g., line voltages, neutral voltages, currents, etc.), and other information, data, etc., which may be in any suitable form such as an electrical signal, digital data, etc., and which may be received from any suitable source, such as one or more sensors, an external network, switches, a user interface associated with the system 100, or other suitable source(s). The feedback circuit 118 provides feedback signal(s) or value(s) to the controller 140 from at least one of the rectifier 110a, the DC circuit 150, and the inverter 110b, and may provide measured motor speed values through appropriate tachometers or other sensors, and/or sensed values from which motor speed, torque, current, and/or voltage, etc. may be determined by the controller 140. In this regard, sensorless motor speed feedback values may be generated internally by the controller 140 via suitable motor models based on the feedback signals or values 118a even for systems having no direct motor speed measurement sensors.

As best shown in FIGS. 1C and 1D, switching control signals 142b are provided to the inverter 110b from an inverter control portion 144b of the switch control system 140, which may employ any suitable form of pulse width modulation circuitry to implement direct digital PWM (FIG. 1C) or carrier-based PWM (FIG. 1D) using the selective phase adjustment techniques described below to reduce or mitigate reflected waves via inverter switching control. The embodiment of FIG. 1C provides an inverter switch control system 144b including a direct digital pulse width modulation component 168 to provide pulse width modulated switching control signals 142b to the inverter 110b via a driver circuit 170 based on a reference vector 171 derived from one or more setpoints 141 (e.g., speed, torque, angle, etc.) and on feedback signals or values 118a representing the output of the inverter 110b (e.g., phase voltages, currents, etc.). FIG. 1D illustrates another exemplary inverter control 144b with a carrier-based (e.g., sine-triangle) pulse width modulation component 168 with a carrier-wave generator 168a and comparators 168b.

The inverter control component 144b in FIGS. 1C and 1D also includes an over-modulation compensation component 164. In operation, the inverter controller 144b receives feedback signals or values 118a, which may be of any form, representing the AC phase outputs (phases U, V, and W in the illustrated examples). The setpoint inputs 141 and the feedback signals or values 118a may be in any suitable form such as an electrical signal, digital data values, etc., and may be received from any suitable source, such as sensors, external networks, switches, a user interface provided on the drive 110, or other suitable source(s). Using the setpoint signals or values 141 and the feedback signals or values 118a, the controller 144b determines a set of phase signals or values ΦU, ΦV, ΦW individually corresponding to the motor load phases U, V, W. The inverter controller 144b may include pre and/or post-compensation components or systems 162 and/or 166, respectively. One or more compensation or adjustment operations may be performed by a pre-compensation component 162 to modify the phase signals or values ΦU, ΦV, ΦW or these may be directly provided to the over-modulation compensation component 164.

The over-modulation compensation component 164 may include or otherwise access an offset value ε, a dwell time value $T_{dwell}$ and a rule set 164a, and any of these may be provided from an external source 172, such as a computer, network, user interface, etc., where an exemplary rule set 164a is shown in FIG. 1E. The compensation component 164 receives the phase signals or values ΦU, ΦV, ΦW (whether pre-compensated or not) and selectively adjusts one or more of these in a given pulse width modulation period $T_{PWM}$ to provide a set of over-modulation compensated phase signals or values ΦU', ΦV', ΦW' if at least one of the phase signals or values ΦU, ΦV, ΦW (whether pre-compensated or not) is transitioning into or out of an over-modulation range. As seen in FIG. 1E, an exemplary rule set 164a provides three rules (RULE 1, RULE 2, and RULE 3), and the illustrated compensation component 164 may implement one, some, or all of these rules 164a. In particular, as described further below in connection with FIGS. 3A-6, the component 164 may operate by adjusting the phase values or signals Φ to prevent transitions between one of the over-modulation ranges and pre-defined bands 302 (RULE 1 of FIG. 1E), to prevent one phase from transitioning into or out of over-modulation if another phase was previously in one of the bands 302 (RULE 2) and/or to prevent two phases from simultaneously transitioning into or out of over-modulation (RULE 3), where enforcement of RULE 1 facilitates control over dwell time and RULE 2 and RULE 3 help to mitigate fast polarity reversals.

The over-modulation compensated phase signals or values ΦU', ΦV', ΦW' may be provided directly from the compensation component 164 to the PWM system 168, or these may be further modified by a post-compensation component 166. The PWM system 168 (direct digital per FIG. 1C or carrier-based as in FIG. 1D) generates the inverter switching control signals 142b by pulse width modulation according to the carrier waveform 202 and the set of over-modulation compensated phase signals or values ΦU', ΦV', ΦW'. In certain implementations, pre and/or post-compensation components 162 and/or 166 can implement various functions, such as reflected wave reduction, common mode reduction, etc. The switch control system 140 and the components 144 and 164 thereof can be implemented as any suitable hardware, processor-executed software or firmware, programmable logic, or combinations thereof operative as any suitable controller or regulator by which the motor 120 is controlled according to one or more desired profile(s) or setpoint(s) 141 in open or closed-loop fashion.

Figure 3A:
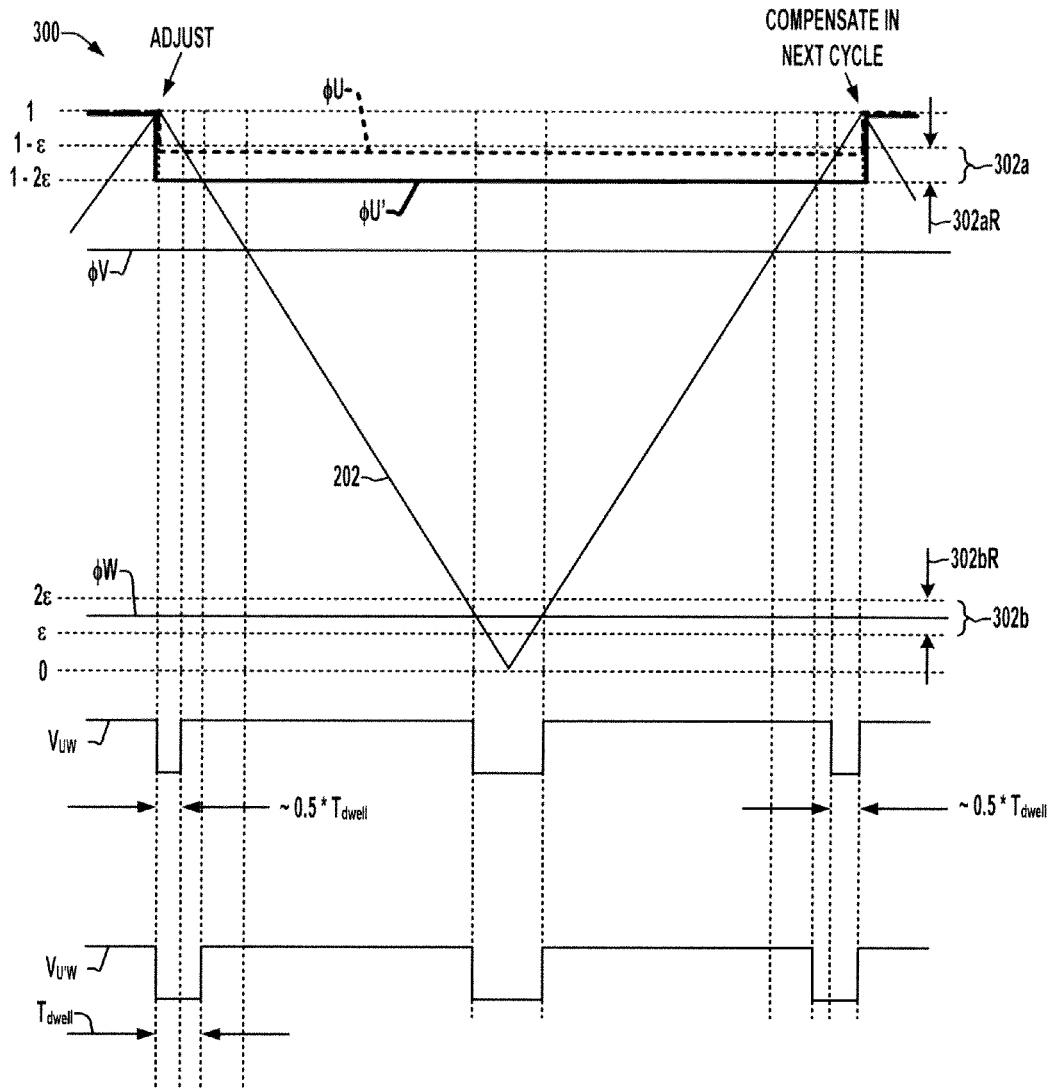
FIGS. 3A and 3B are pulse width modulation waveform diagrams illustrating selective adjustment of a phase transitioning into or out of over-modulation to combat dwell time reduction in the system of FIGS. 1A-1E.
Figure 3B:
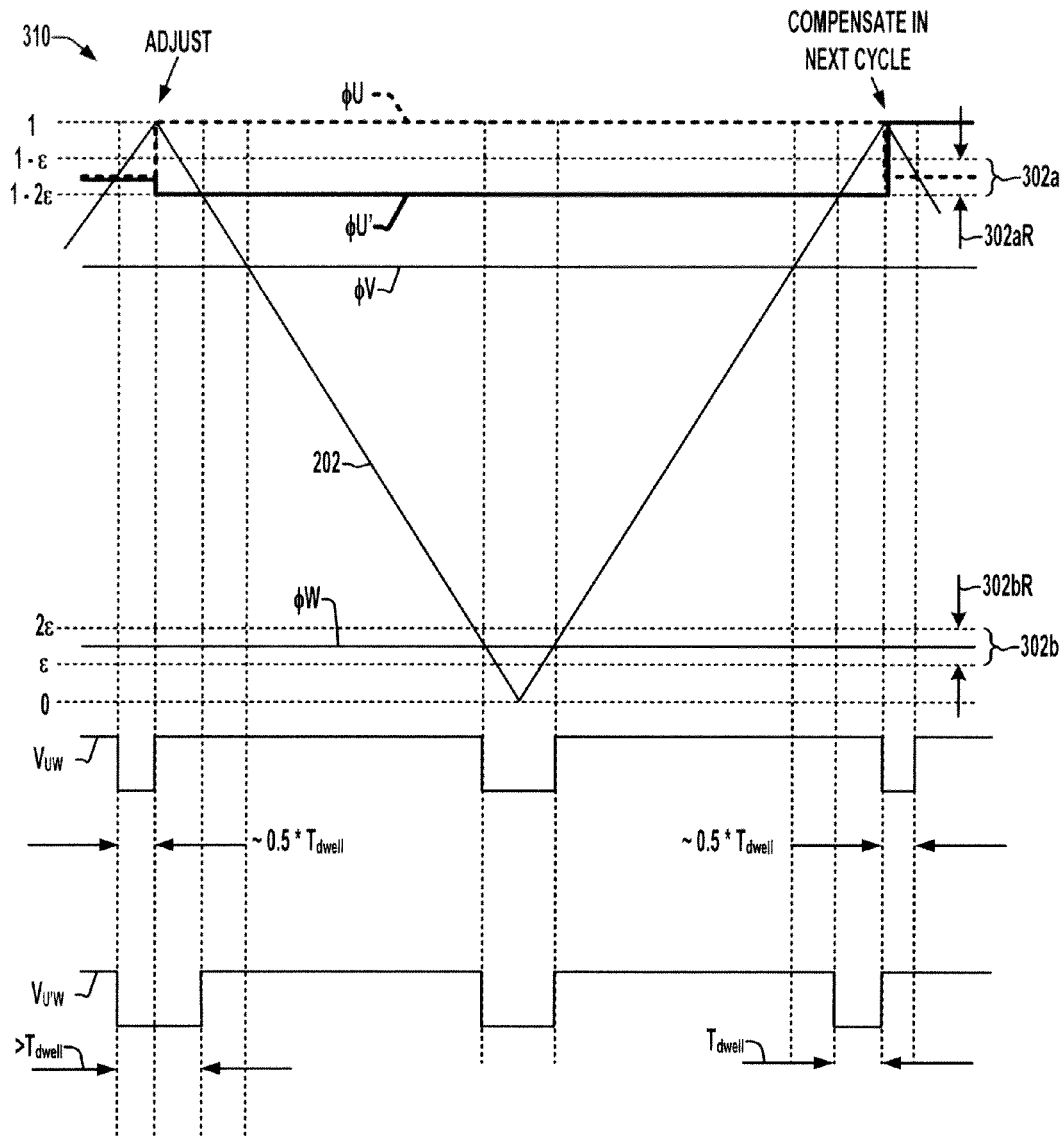
Figure 4:
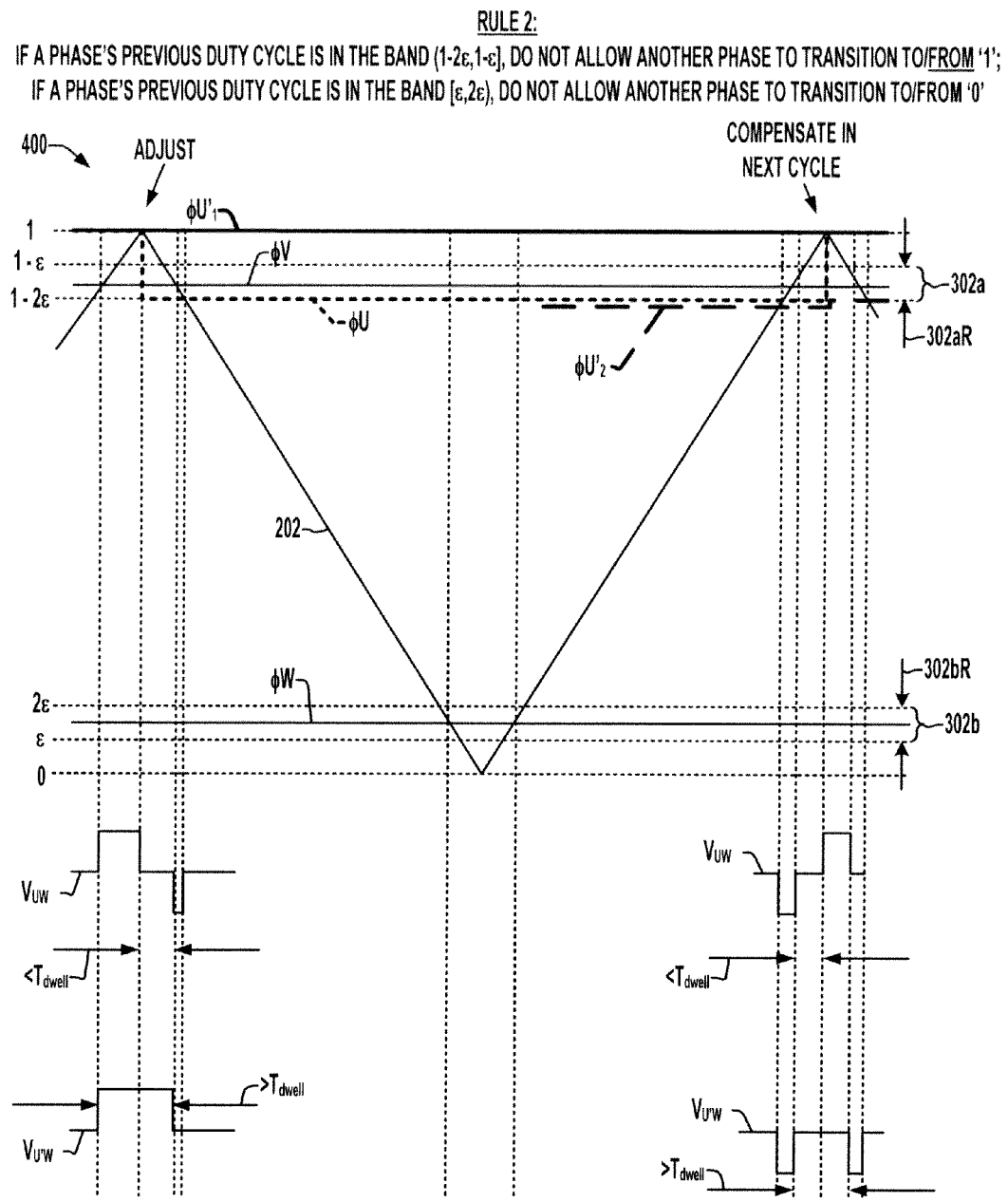
FIG. 4 is a pulse width modulation waveform diagram illustrating selective phase adjustment to mitigate polarity reversal time reduction in the system of FIGS. 1A-1E.
Figure 5:
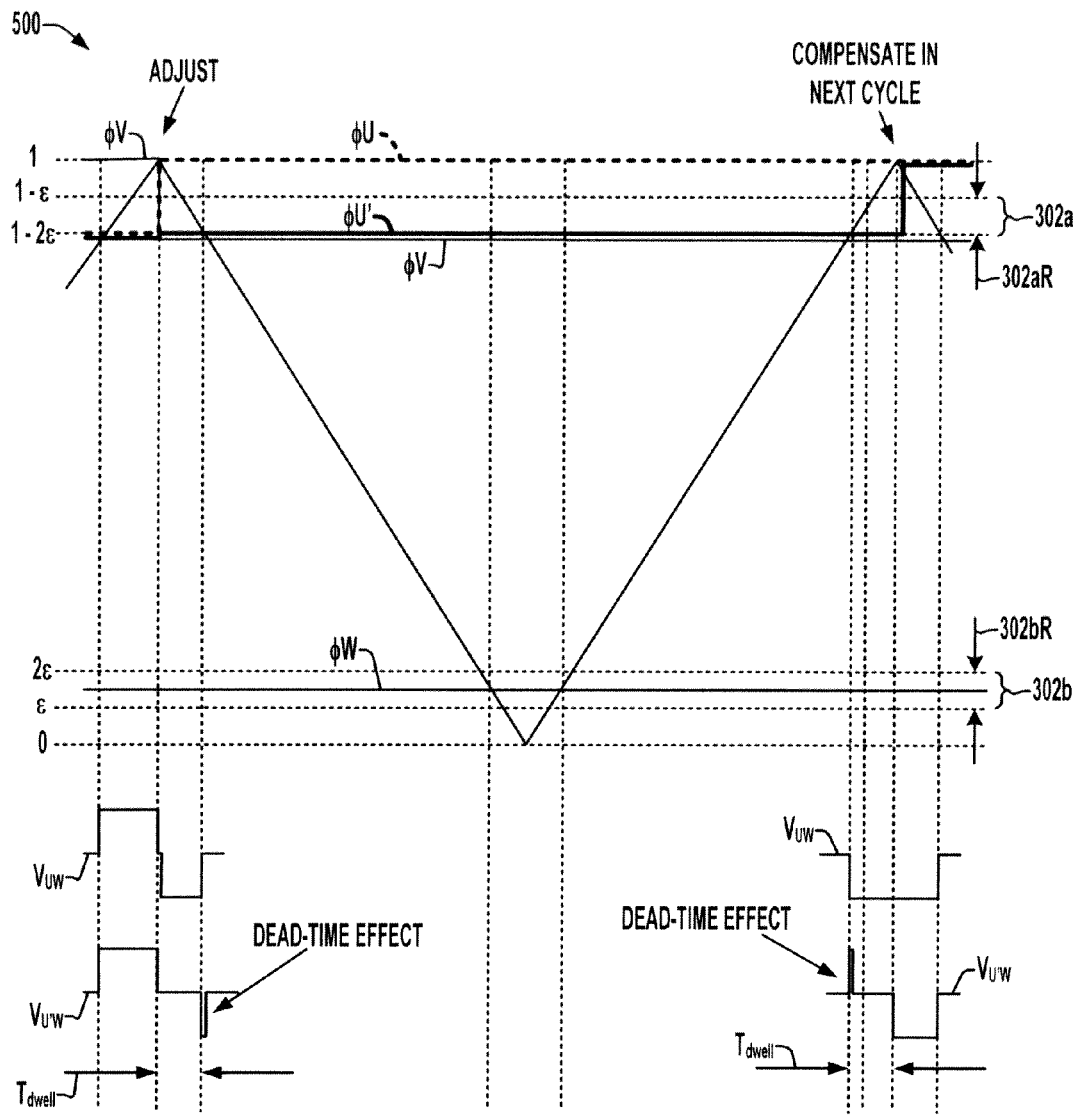
FIG. 5 is a pulse width modulation waveform diagram illustrating selective phase adjustment to allow only a single phase to transition into or out of over-modulation in the system of FIGS. 1A-1E.
Figure 6:
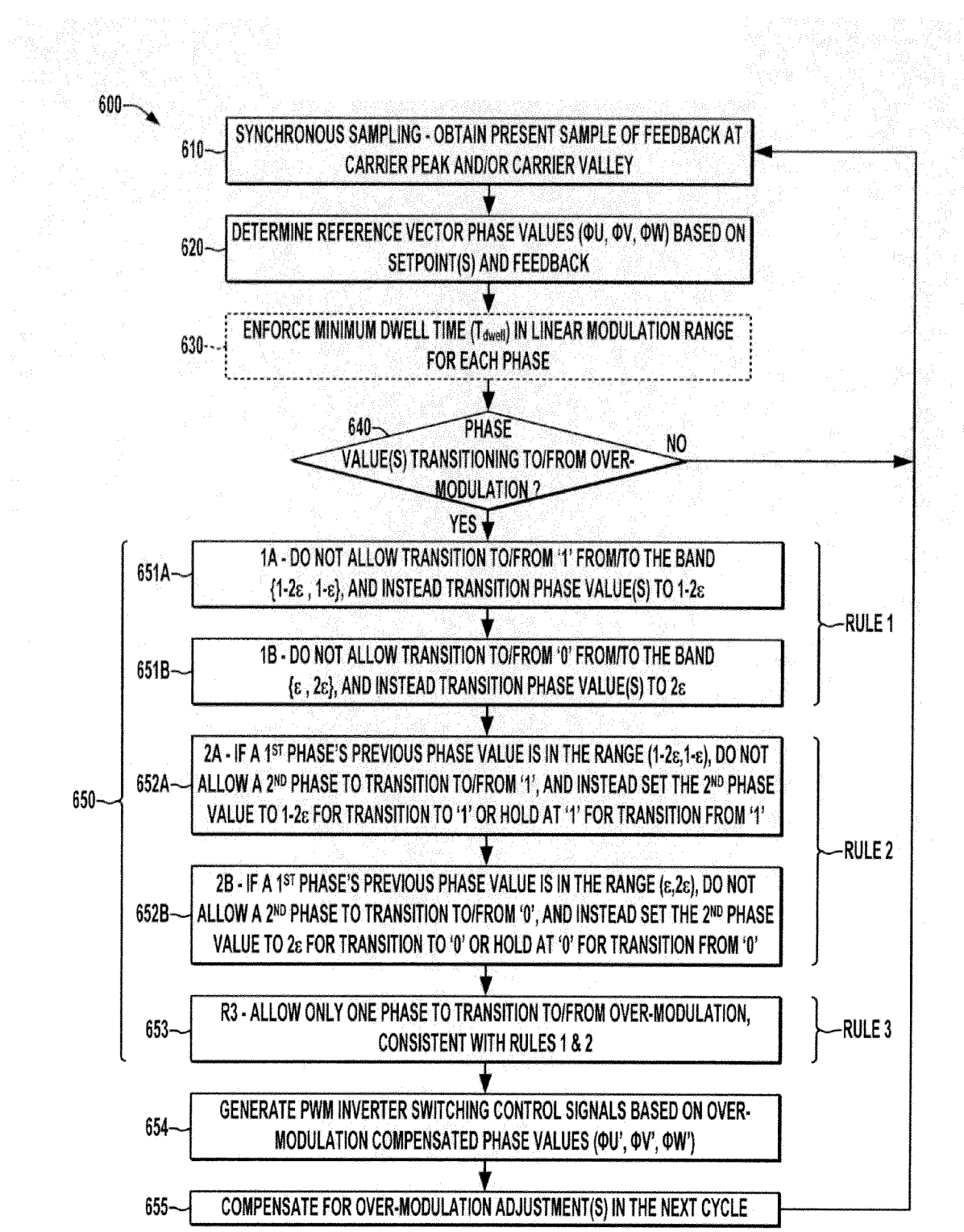
FIG. 6 is a flow diagram illustrating an exemplary method of operating a pulse width modulated inverter in accordance with one or more aspects of the present disclosure.

Referring to FIGS. 3A-6, in certain embodiments, the over-modulation compensation component 164 operates to provide selective phase signal or value adjustment for over-modulation situations in operating the inverter 110b generally according to a process 600 outlined in FIG. 6, and is described below with respect to the process 600. FIGS. 3A and 3B illustrate exemplary applications of RULE 1. FIG. 4 shows application of RULE 2, and FIG. 5 depicts operation of RULE 3 consistent with rules 1 and 2.

As seen in FIGS. 3A-5, the carrier waveform range 202R includes an upper first band 302a spaced from and below the carrier maximum value "1", with the first band 302a extending from a first lower band value to a first upper band value. In addition, a lower second band 302b is defined within the carrier range 202R (below the first range 302a), which extends from a lower second band value spaced from and above the carrier minimum value "0" to an upper second band value, where the first band 302a is spaced from and above the second band 302b. The bands 302 may, but need not be of equal ranges, and may but need not be offset from the respective carrier maximum and minimum values by the same amount. In certain embodiments, an offset amount ε is stored in (or otherwise accessible by) the over-modulation compensation component 164 (e.g., as seen in FIGS. 1C and 1D above), which may be set by a user or otherwise derived from an external source 172. In one implementation, the offset amount ε is determined based on the carrier waveform 202 and a desired minimum dwell time. In the illustrated embodiments, the first band 302a has an upper first band value 1-ε spaced from and below the carrier maximum value "1" by the offset amount ε and a lower first band value 1-ε, where the first band range 302aR is equal to the offset amount ε. In these embodiments, moreover, a complementary second band 302b has a lower second band value ε spaced from and above the carrier minimum value "0" by the offset amount and an upper second band value of 2ε, such that the second band range 302bR is also equal to the offset amount ε.

As seen in FIG. 6, the process 600 begins with the over-modulation compensation component 164 beginning a new sample period at 610 by obtaining the feedback signals or values 118a (e.g., individually representing corresponding voltages or currents of the load phases U, V, W) at either or both of the peak (carrier maximum value "1") and/or valley (minimum value "0") of the carrier waveform 202. At 620, the over-modulation compensation component 164 determines the current phase values Φ (e.g., ΦU, ΦV, and ΦW in the illustrated three-phase example) to form a reference vector 171 based on the setpoint(s) 141 and feedback signals or values 118a (e.g., line-to-line motor phase voltages, motor line currents, etc.) to represent the desired state of the motor drive output. The over-modulation compensation component 164 optionally implements linear-modulation enforcement of minimum dwell time performance at 630 for the individual phase values, for instance, as described in U.S. Pat. No. 6,819,070 to Kerkman et al.

At 640, the over-modulation compensation component 164 determines whether any of the updated phase signals or values ΦU, ΦV, and/or ΦW of the current carrier cycle is transitioning to or from an over-modulation condition (e.g., transition to or from a value greater than or equal to the carrier maximum value "1" or transitioning to or from a value less than or equal to the carrier minimum value "0" in this example), based on a comparison with the previous phase signals or values. If not (NO at 640), the process 600 returns for the next sample update at 610 as described above.

If one or more of the phase signals or values ΦU, ΦV, and/or ΦW is transitioning into or out of over-modulation condition (YES at 640 in FIG. 6), the over-modulation compensation component 164 selectively adjusts at least one phase signal or value ΦU, ΦV, ΦW in the current PWM period $T_{PWM}$ at 650 to provide a set of over-modulation compensated phase signals or values ΦU', ΦV', ΦW', and generates the inverter switching control signals 142b at 654 by pulse width modulation according to the carrier waveform 202 and the set of over-modulation compensated phase signals or values ΦU', ΦV', ΦW'. In certain embodiments, if a given phase signal or value Φ is adjusted in one pulse width modulation period $T_{PWM}$, the over-modulation compensation component 164 selectively makes a compensating adjustment at 655 to the given phase signal or value Φ in a subsequent pulse width modulation period $T_{PWM}$. Thereafter, the process 600 returns for the next sample update at 610.

The over-modulation compensation component 164 may implement one or more of the rules 164a (FIG. 1E) in performing the selective phase signal or value adjustment at 650. As seen in FIGS. 3A and 6, the over-modulation compensation component 164 is operative to implement RULE 1A if a given phase signal or value (e.g., phase ΦU in FIG. 3A) transitions from the carrier maximum value "1" to the first band 302a, by adjusting the phase signal or value ΦU' at 651A to the lower first band value 1-2ε. As shown at the lower portion of FIG. 3A, the adjustment ensures that the resulting low-going pulse in the line-to-line voltage $V_{U'W}$ has a duration of $t_{dwell}$, whereas failure to make this adjustment would result in a voltage $V_{UW}$ with a pulse width of only about half the specified minimum dwell time. FIG. 3B illustrates another example in which the phase signal or value ΦU transitions to over-modulation from the first band 302a, where implementation of RULE 1A at 651A instead forces ΦU' to the first lower band value 1-2ε. In this manner, enforcement of RULE 1A facilitates reduction in reflected waves and enforces the dwell time specification for over-modulation situations. For phase transition into or out of the lower over-modulation condition, and the over-modulation compensation component 164 implements RULE 1B at 651B in FIG. 6 if the given phase signal or value ΦU transitions between the carrier minimum value "0" and the second band 302b to adjust the given phase signal or value ΦU' to the upper second band value 2ε. The first rule thus mitigates quick motor voltage pulses and thereby reduces the likelihood that the motor load 120 will experience excessive voltage levels cause by reflected waves. In certain embodiments, moreover, if a given phase signal or value ΦU is adjusted in one pulse width modulation period $T_{PWM}$ the over-modulation compensation component 164 compensates at 655 in FIG. 6 in the next cycle (shown at the right side of FIGS. 3A and 3B) by making a compensating adjustment to the given phase signal or value ΦU in a subsequent pulse width modulation period $T_{PWM}$.

Referring also to FIG. 4, the over-modulation compensation component 164 may also implement RULE 2A and/or 2B to mitigate polarity reversal time reduction. In this case, RULE 2A is applied if a first phase signal or value (e.g., ΦV in FIG. 4) is in the first range 302a and a second phase signal or value ΦU transitions to or from the carrier maximum value "1". For one possible situation, where the second signal or value transitions to the carrier maximum value, the over-modulation compensation component 164 adjusts the second phase signal or value ΦU' at 652A instead to the lower first band value 1-2ε. As shown in the example of FIG. 4, if the first phase signal or value ΦV is in the first range 302a and the second phase signal or value ΦU transitions from the carrier maximum value "1", the over-modulation compensation component 164 adjusts the second phase signal or value ΦU' to instead remain at the carrier maximum value "1", whereby the resulting phase reversal time for the line-to-line voltage $V_{U'W}$ exceeds $t_{dwell}$. As in the enforcement of RULE 1 above, if such adjustment is made in one PWM period $T_{PWM}$, the over-modulation compensation component 164 in certain embodiments compensates at 655 in the next cycle, as seen in the right side of FIG. 4. The over-modulation compensation component 164 may similarly make adjustments per RULE 2B at 652B for transitions to or from the lower over-modulation range. For instance, if a first phase signal or value is in the second range 302b and a second phase signal or value transitions to the carrier minimum value "0", the second phase signal or value ΦU' is adjusted to the upper second hand value 2ε at 652B, and if the first phase signal or value is in the second range 302b on and the second phase signal or value transitions from the carrier minimum value "0", the second phase signal or value is adjusted to instead remain at the carrier minimum value "0".

Referring also to FIG. 5, reversal time enforcement may also be facilitated in certain embodiments by the over-modulation compensation component 164 making selective adjustments per RULE 3 at 653 when two phase signals or values (e.g., ΦV and ΦU in the example of FIG. 5) are concurrently transitioning to or from the carrier maximum value "1" or are transitioning to or from the carrier minimum value "0". In this case, the over-modulation compensation component 164 selectively adjusts one of the two phase signals or values (e.g., phase ΦU' in the illustrated example) to remain at its previous level. As seen at the right in FIG. 5, moreover, the over-modulation compensation component 164 may make a compensating adjustment to the given phase signal or value ΦU in a subsequent pulse width modulation period $T_{PWM}$. The selection between two concurrently transitioning phases may be done based on any suitable criteria or algorithm, such as round-robin selection in certain embodiments.

In accordance with further aspects of the disclosure, the above described techniques may be embodied as non-transitory computer-readable media including computer-executable instructions for performing the above described method steps, with intermediate and final values being stored in a memory, such as electronic memory situated in the exemplary switch control system 140 or elsewhere in the power conversion system 110 or in a memory operatively coupled therewith.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system comprising:
    an inverter comprising a plurality of AC terminals for supplying AC electrical power to a load, and a switching network comprising a plurality of switching devices individually operable according to a corresponding inverter switching control signal; and
    a switch control system comprising:
        a pulse width modulation system operative to provide the inverter switching control signals by pulse width modulation at least partially according to a carrier waveform and a set of phase signals or values individually corresponding to a load phase associated with one of the AC terminals of the inverter, the carrier waveform having a carrier period and a carrier waveform range extending from a carrier maximum value to a carrier minimum value, the phase signals or values being determined based on at least one setpoint signal or value and on feedback signals or values individually corresponding to voltages or currents of the load phases, and an over-modulation compensation component operative in a given pulse width modulation period to selectively adjust at least one phase signal or value to provide a set of over-modulation compensated phase signals or values if at least one of the phase signals or values is transitioning into or out of an over-modulation range outside the carrier waveform range in a current sample cycle, and to provide the set of over-modulation compensated phase signals or values to the pulse width modulation system to provide the inverter switching control signals by pulse width modulation according to the set of over-modulation compensated phase signals or values.

2. The power conversion system of claim 1;
the carrier waveform range including:
a first band with a lower first band value and a first band range offset from and below the carrier maximum value, and
a second band with an upper second band value and a second band range offset from and above the carrier minimum value, the first band being spaced from and above the second band, and the first band and the second band being non-overlapping;
where the first band has an upper first band value spaced from and below the carrier maximum value by an offset amount, where the first band range is equal to the offset amount, where the second band has a lower second band value spaced from and above the carrier minimum value by the offset amount, and where the second band range is equal to the offset amount.

3. The power conversion system of claim 1:
the carrier waveform range including:
a first band with a lower first band value and a first band range offset from and below the carrier maximum value, and
a second band with an upper second band value and a second band range offset from and above the carrier minimum value, the first band being spaced from and above the second band, and the first band and the second band being non-overlapping;
where the over-modulation compensation component is operative if a first phase signal or value is in the first range and a second phase signal or value transitions to the carrier maximum value to adjust the second phase signal or value to the lower first band value;
where the over-modulation compensation component is operative if the first phase signal or value is in the first range and the second phase signal or value transitions from the carrier maximum value to adjust the second phase signal or value to remain at the carrier maximum value;
where the over-modulation compensation component is operative if the first phase signal or value is in the second range and the second phase signal or value transitions to the carrier minimum value to adjust the second phase signal or value to the upper second band value; and where the over-modulation compensation component is operative if the first phase signal or value is in the second range and the second phase signal or value transitions from the carrier minimum value to adjust the second phase signal or value to remain at the carrier minimum value.

4. The power conversion system of claim 1, where the over-modulation compensation component is operative if a given phase signal or value is adjusted in one pulse width modulation period to make a compensating adjustment to the given phase signal or value in a subsequent pulse width modulation period.

5. The power conversion system of claim 4;
the carrier waveform range including:
a first band with a lower first band value and a first band range offset from and below the carrier maximum value, and
a second band with an upper second band value and a second band range offset from and above the carrier minimum value, the first band being spaced from and above the second band, and the first band and the second band being non-overlapping;
where the first band has an upper first band value spaced from and below the carrier maximum value by an offset amount, where the first band range is equal to the offset amount, where the second band has a lower second band value spaced from and above the minimum value by the offset amount, and where the second band range is equal to the offset amount.

6. The power conversion system of claim 1, where the over-modulation compensation component is operative if two phase signals or values are transitioning to or from the carrier maximum value or are transitioning to or from the carrier minimum value, to adjust one of the two phase signals or values to remain at its previous level.

7. The power conversion system of claim 6;
the carrier waveform range including:
a first band with a lower first band value and a first band range offset from and below the carrier maximum value, and
a second band with an upper second band value and a second band range offset from and above the carrier minimum value, the first band being spaced from and above the second band, and the first band and the second band being non-overlapping;
where the first band has an upper first band value spaced from and below the carrier maximum value by an offset amount, where the first band range is equal to the offset amount, where the second band has a lower second band value spaced from and above the carrier minimum value by the offset amount, and where the second band range is equal to the offset amount.

8. The power conversion system of claim 6, where the over-modulation compensation component is operative if a given phase signal or value is adjusted in one pulse width modulation period to make a compensating adjustment to the given phase signal or value in a subsequent pulse width modulation period.

9. The power conversion system of claim 8;
the carrier waveform range including:
a first band with a lower first band value and a first band range offset from and below the carrier maximum value, and
a second band with an upper second band value and a second band range offset from and above the carrier minimum value, the first band being spaced from and above the second band, and the first band and the second band being non-overlapping;

where the first band has an upper first band value spaced from and below the carrier maximum value by an offset amount, where the first band range is equal to the offset amount, where the second band has a lower second band value spaced from and above the carrier minimum value by the offset amount, and where the second band range is equal to the offset amount.

10. The power conversion system of claim 1:

the carrier waveform range including:
 a first band with a lower first band value and a first band range offset from and below the carrier maximum value, and
 a second band with an upper second band value and a second band range offset from and above the carrier minimum value, the first band being spaced from and above the second band, and the first band and the second band being non-overlapping;

where the over-modulation compensation component is operative if a given phase signal or value transitions between the carrier maximum value and the first band to adjust the given phase or value to the lower first band value and operative if the given phase signal or value transitions between the carrier minimum value and the second band to adjust the given phase signal or value to the upper second band value.

11. The power conversion system of claim 10:

where the over-modulation compensation component is operative if a first phase signal or value is in the first band range and a second phase signal or value transitions to the carrier maximum value to adjust the second phase signal or value to the lower first band value;

where the over-modulation compensation component is operative if the first phase signal or value is in the first band range and the second phase signal or value transitions from the carrier maximum value to adjust the second phase signal or value to remain at the carrier maximum value;

where the over-modulation compensation component is operative if the first phase signal or value is in the second band range and the second phase signal or value transitions to the carrier minimum value to adjust the second phase signal or value to the upper second band value; and where the over-modulation compensation component is operative if the first phase signal or value is in the second band range and the second phase signal or value transitions from the carrier minimum value to adjust the second phase signal or value to remain at the carrier minimum value.

12. The power conversion system of claim 11, where the first band has an upper first band value spaced from and below the carrier maximum value by an offset amount, where the first band range is equal to the offset amount, where the second band has a lower second band value spaced from and above the carrier minimum value by the offset amount, and where the second band range is equal to the offset amount.

13. The power conversion system of claim 11, where the over-modulation compensation component is operative if a given phase signal or value is adjusted in one pulse width modulation period to make a compensating adjustment to the given phase signal or value in a subsequent pulse width modulation period.

14. The power conversion system of claim 13, where the first band has an upper first band value spaced from and below the carrier maximum value by an offset amount, where the first band range is equal to the offset amount, where the second band has a lower second band value spaced from and above the carrier minimum value by the offset amount, and where the second band range is equal to the offset amount.

15. The power conversion system of claim 11, where the over-modulation compensation component is operative if two phase signals or values are transitioning to or from the carrier maximum value or are transitioning to or from the carrier minimum value, to adjust one of the two phase signals or values to remain at its previous level.

16. The power conversion system of claim 15, where the first band has an upper first band value spaced from and below the carrier maximum value by an offset amount, where the first band range is equal to the offset amount, where the second band has a lower second band value spaced from and above the carrier minimum value by the offset amount, and where the second band range is equal to the offset amount.

17. The power conversion system of claim 15, where the over-modulation compensation component is operative if a given phase signal or value is adjusted in one pulse width modulation period to make a compensating adjustment to the given phase signal or value in a subsequent pulse width modulation period.

18. The power conversion of claim 17, where the first band has an upper first band value spaced from and below the carrier maximum value by an offset amount, where the first band range is equal to the offset amount, where the second band has a lower second band value spaced from and above the carrier minimum value by the offset amount, and where the second band is equal to the offset amount.

19. A method of operating a pulse width modulated inverter to convert DC power to multi-phase AC output power, the method comprising:

determining a set of phase signals or values individually corresponding to a load phase associated with AC output terminals of the inverter based on at least one setpoint signal or value and on feedback signals or values individually corresponding to voltages or currents of the load phases, selectively adjusting at least one phase signal or value in a given pulse width modulation period to provide a set of over-modulation compensated phase signals or values if at least one of the phase signals or values is transitioning into or out of an over-modulation range outside a pulse width modulation carrier waveform range in a current sample cycle; and generating inverter switching control signals by pulse width modulation according to a carrier waveform and the set of over-modulation compensated phase signals or values, the carrier waveform having a carrier period and a carrier waveform range extending from a carrier maximum value to a carrier minimum value.

20. The method of claim 19, further comprising if a given phase signal or value is adjusted in one pulse width modulation period, making a compensating adjustment to the given phase signal or value in a subsequent pulse width modulation period.

21. The method of claim 19:

where the carrier waveform range includes a first band with a lower first band value and a first band range offset from and below the carrier maximum value and a second band with an upper second band value and a second band range offset from and above the carrier minimum value, the first band being spaced from and above the second band, the first band and the second band being non-overlapping; and where selectively adjusting at least one phase signal or value comprises:
  if a given phase signal or value transitions between the carrier maximum value and the first band, adjusting the given phase signal or value to the lower first band value, and
  if the given phase signal or value transitions between the carrier minimum value and the second band, adjusting the phase signal or value to the upper second band value.

22. The method of claim 21, where selectively adjusting at least one phase or value comprises:
  if a first phase signal or value is in the first range and a second phase signal or value transitions to the carrier maximum value, adjusting the second phase signal or value to the lower first band value;
  if the first phase signal or value is in the first range and the second phase signal or value transitions from the carrier maximum value, adjusting the second phase signal or value to remain at the carrier maximum value;
  if the first phase signal or value is in the second range and the second phase signal or value transitions to the carrier minimum value, adjusting the second phase signal or value to the upper second band value; and
  if the first phase signal or value is in the second range and the second phase signal or value transitions from the carrier minimum value, adjusting the second phase signal or value to remain at the carrier minimum value.

23. The method of claim 22, where selectively adjusting at least one phase signal or value comprises:
  if two phase signals or values are transitioning to or from the carrier maximum value or are transitioning to or from the carrier minimum value, adjusting one of the two phase signals or values to remain at its previous level.

24. The method of claim 23, further comprising if the given phase signal or value is adjusted in one pulse width modulation period, making a compensating adjustment to the given phase signal or value in a subsequent pulse width modulation period.

25. A method of operating a pulse width modulated inverter to convert DC power to multi-phase AC output power, the method comprising:
  determining a set of phase signals or values individually corresponding to a load phase associated with AC output terminals of the inverter based on at least one setpoint signal or value and on feedback signals or values individually corresponding to voltages or currents of the load phases;
  selectively adjusting at least one phase signal or value in a given pulse width modulation period to provide a set of over-modulation compensated phase signals or values if at least one of the phase signals or values is transitioning into or out of an over-modulation range outside a pulse width modulation carrier waveform range in a current sample cycle; and
  generating inverter switching control signals by pulse width modulation according to a carrier waveform and the set of over-modulation compensated phase signals or values, the carrier waveform having a carrier period and a carrier waveform range extending from a carrier maximum value to a carrier minimum value;
  where the carrier waveform range includes a first band with a lower first band value and a first band range offset from and below the carrier maximum value and a second band with an upper second band value and a second band range offset from and above the carrier minimum value, the first band being spaced from and above the second band; and
  where selectively adjusting at least one phase signal or value comprises:
    if a first phase signal or value is in the first range and a second phase signal or value transitions to the carrier maximum value, adjusting the second phase signal or value to the lower first band value,
    if the first phase signal or value is in the first range and the second phase signal or value transitions from the carrier maximum value, adjusting the second phase signal or value to remain at the carrier maximum value,
    if the first phase signal or value is in the second range and the second phase signal or value transitions to the carrier minimum value, adjusting the second phase signal or value to the upper second band value, and
    if the first phase signal or value is in the second range and the second phase signal or value transitions from the carrier minimum value, adjusting the second phase signal or value to remain at the carrier minimum value.

26. A method of operating a pulse width modulated inverter to convert DC power to multi-phase AC output power, the method comprising:
  determining a set of phase signals or values individually corresponding to a load phase associated with AC output terminals of the inverter based on at least one setpoint signal or value and on feedback signals or values individually corresponding to voltages or currents of the load phases;
  selectively adjusting at least one phase signal or value in a given pulse width modulation period to provide a set of over-modulation compensated phase signals or values if at least one of the phase signals or values is transitioning into or out of an over-modulation range outside a pulse width modulation carrier waveform range in a current sample cycle; and
  generating inverter switching control signals by pulse width modulation according to a carrier waveform and the set of over-modulation compensated phase signals or values, the carrier waveform having a carrier period and a carrier waveform range extending from a carrier maximum value to a carrier minimum value;
  where selectively adjusting at least one phase signal or value comprises: if two phase signals or values are transitioning to or from the carrier maximum value or are transitioning to or from the carrier minimum value, adjusting one of the two phase signals or values to remain at its previous level.

27. A non-transitory computer readable medium comprising computer-executable instructions for operating a pulse width modulated inverter to convert DC power to multi-phase AC output power, the computer readable medium comprising computer-executable instructions for:
  determining a set of phase signals or values individually corresponding to a load phase associated with AC output terminals of the inverter based on at least one setpoint signal or value and on feedback signals or values individually corresponding to voltages or currents of the load phases,
  selectively adjusting at least one phase signal or value in a given pulse width modulation period to provide a set of over-modulation compensated phase signals or values if at least one of the phase signals or values is transitioning into or out of an over-modulation range outside a pulse width modulation carrier waveform range in a current sample cycle; and generating inverter switching control signals by pulse width modulation according to a carrier waveform and the set of over-modulation compensated phase signals or values, the carrier waveform having a carrier period and a carrier waveform range extending from a carrier maximum value to a carrier minimum value.

* * * * *